US005535715A

United States Patent [19]
Mouton

[11] Patent Number: 5,535,715
[45] Date of Patent: Jul. 16, 1996

[54] GEARED RECIPROCATING PISTON ENGINE WITH SPHERICAL ROTARY VALVE

[76] Inventor: William J. Mouton, 619 Roseland Pkwy., New Orleans, La. 70123

[21] Appl. No.: 344,088

[22] Filed: Nov. 23, 1994

[51] Int. Cl.[6] .............................. F16H 19/04; F16H 21/16
[52] U.S. Cl. .............................. 123/197.1; 123/55.5
[58] Field of Search .............................. 123/197.1, 197.3, 123/55.2, 55.5, 55.7

[56] References Cited

U.S. PATENT DOCUMENTS

| | | | |
|---|---|---|---|
| 1,567,172 | 12/1925 | Powell | 123/197.1 |
| 3,384,057 | 5/1968 | Boone | 123/197.1 |
| 3,610,214 | 10/1971 | Braun | 123/46 |
| 3,853,100 | 12/1974 | Braun | 123/46 |
| 3,868,932 | 3/1975 | Toth | 123/197.1 |
| 4,944,261 | 7/1990 | Coates | 123/190 |
| 4,953,527 | 9/1990 | Coates | 123/190 |
| 4,976,232 | 12/1990 | Coates | 123/190 |
| 5,031,581 | 7/1991 | Powell | 123/58 |
| 5,076,219 | 12/1991 | Pellerin | 123/59 |
| 5,103,778 | 4/1992 | Usich, Jr. | 123/58 |
| 5,109,814 | 5/1992 | Coates | 123/190.14 |
| 5,228,415 | 7/1993 | Williams | 123/51 |
| 5,259,256 | 11/1993 | Brackett | 74/46 |
| 5,351,566 | 10/1994 | Barnett | 123/197.1 |
| 5,361,739 | 11/1994 | Coates | 123/190.14 |
| 5,406,859 | 4/1995 | Belford | 123/197.1 |

*Primary Examiner*—David A. Okonsky
*Attorney, Agent, or Firm*—Pravel, Hewitt, Kimball & Krieger

[57] ABSTRACT

A gear driven four cycle, opposed, internal combustion engine with pairs of twin pistons connected by a semi-rigid shaft converts reciprocating motion to rotary torque by segmented upper and lower rack and pinion gears which alternate left and right, above and below, with a rocking rack motion at the precise centerline of the piston travel. Central oscillating arms with pairs of translating, rotating cranks, on each side of the twin pistons, smoothly reverse the piston directions without stressing the rack and pinion gear drives. Lateral loads and friction from the piston to the cylinder walls are eliminated. The equivalent torque developed is more than quadruple that of a conventional crankshaft design. The parallel twin cylinders are connected by a common rotary valve at each end of the opposed cylinders. Each cylinder houses a spherical rotary valve with an internal flow baffle which is connected to companion rotary valves by concentric shafts. The sphere is sealed with concentric piston rings inserted into a donut compression head at the top of the cylinder, below the large diameter intake and exhaust manifolds. The rotary valve, the drive pinions and the pistons are interconnected by gears for one full rotation per four cycle power stroke. Improved supercharged intake and exhaust flows are realized by the gently curved directional flow of the spherical valve over that of conventional plunger types of valves. Exhaust gas scavenging is enhanced by the overlapping intake stroke of the baffled spherical valve. Simplified manufacture, elimination of sliding friction, low weight, and multiple torque per horsepower are claimed.

9 Claims, 11 Drawing Sheets

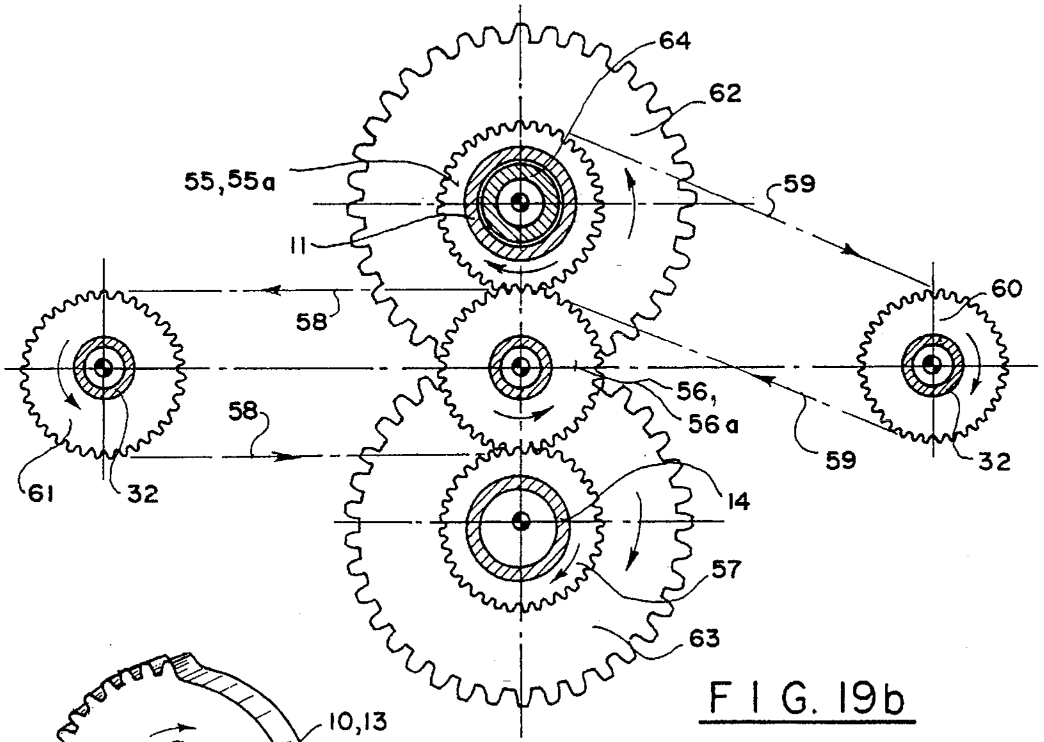
FIG. 19b
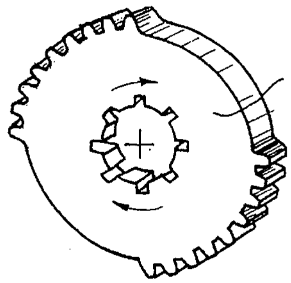
FIG. 20a
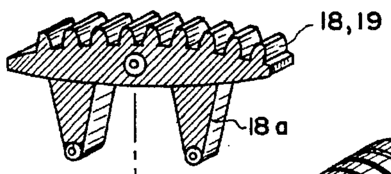
FIG. 20b
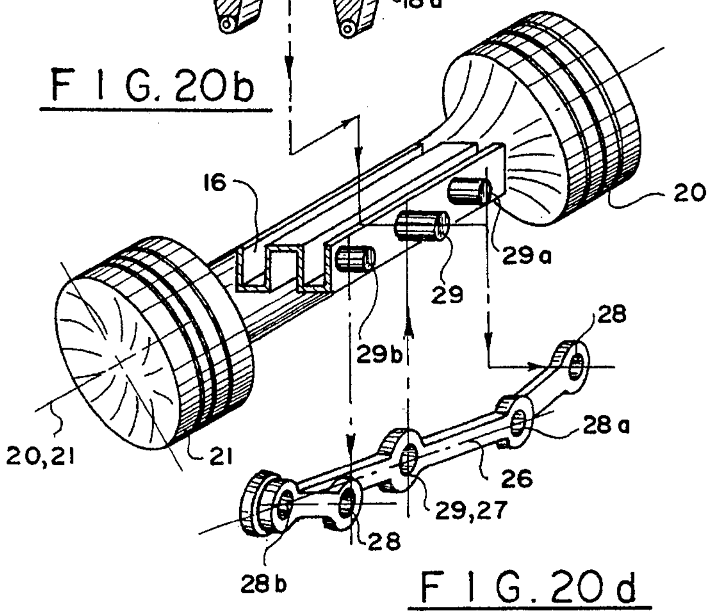
FIG. 20c
FIG. 20d

GEARED RECIPROCATING PISTON ENGINE WITH SPHERICAL ROTARY VALVE

BACKGROUND OF THE INVENTION

The invention relates to multiple, opposed, reciprocating piston engines driven by alternating, segmented rack and pinion gears, along the centerline of the cylinder, without the eccentric side force required in a conventional crankshaft or sinusoidal-cam driven shaft. The engine is supercharged with a single sealed spherical rotary valve similar in diameter to the cylinder bore. This engine is very compact and may replace any conventional reciprocating engine presently in use.

The advantages of the invention will be listed and are the result of two major improvements, the first being a constant-torque-arm input of the piston travel to the alternating rack and pinion gears, and the second the use of a large diameter spherical valve which, in one rotation accomplishes all of the functions of a cylinder head with two or more reciprocating cylinder head valves.

Prior art in the conversion of reciprocating engine thrust to rotary motion deals with various types of sinusoidal cams, which will be listed below. The sinusoidal cam, as first perfected in the Hermann engine, now known as the "Dynacam Engine" was certified by the Civil Aeronautics Administration for aircraft and helicopter use in 1953. The development of this engine was financed by the U.S. Government during WW-2. Most of the prior art since 1957 deals with varying applications of this engine's sinusoidal cam, which provides up to three times the torque of a conventional crankshaft engine. U.S. Pat. No. 3,385,051 of May, 1968 precisely describes the original Hermann engine sinusoidal cam, yet with a piston roller bearing having cam rollers at the exterior of the pistons which was probably inoperative, creating more eccentric piston-wall friction than the certified U.S. engine.

U.S. Pat. No. 5,103,778 of April, 1992 shows the correct Hermann engine four-cycle sinusoidal cam on a central shaft of a barrel type engine. The cam rollers are at the center of the pistons precisely as used in the well advertised Hermann "Dynacam" engine. This Patent specifically claims a conical rotary valve at the head of the barrel engine cylinders which would have the same stealing leakage's as a large flat plate circular rotary "disc" valve.

This tripling of the torque of the Hermann engine over that of a crankshaft machine is due to the fact that the torque is first doubled by the effect of each revolution of the drive shaft encompassing all four strokes of the four cycle engine process. Crankshaft engines receive only one power stroke to two revolutions of the drive shaft. Another 100 percent improvement in the torque is due to the fact that the cam drive roller bearing surface is always at an equal distance from the drive shaft during all power, exhaust, intake, and compression strokes.

This was and still is revolutionary, however a large component of the power stroke and the compression stroke must be carried by the side thrust of the piston cam rollers against the approximate 45 degree angle of the sinusoidal cam.

The result is a 30 percent loss of available power stroke thrust of the cam-driven engine and a significant friction loss of the piston rings against the cylinder walls. However, this is a tremendous improvement over that of a crankshaft drive which has near zero torque at the top-dead-center mode of the power stroke explosion, and the resulting side thrust of the crankshaft at the maximum torque at half-piston travel is far greater than that of the sinusoidal cam driven engine.

For instance, a 210 horsepower Hermann engine develops some 600 ft. pounds of torque. Even with the crankshaft offset a few degrees, (to improve the top-dead-center dilemma), modern engines produce a little better than 6 percent more torque than horsepower.

The invention herein described thus has the potential of developing four to five times the torque of a conventional crankshaft engine, with a considerable increase in horsepower due to the virtual elimination of sliding friction between pistons and cylinder walls. This is made possible by the unique positioning of the upper and lower alternating rack and pinion gears, with a rocking arm action of the rack-drive-gears, precisely at the center of the piston travel within the cylinders. Further, the quadruple, translating crank arms smoothly reverse the direction of the reciprocating pistons to mesh precisely with the intersecting teeth of the axial-alternating pinion gear drive system. This precise machining process could have been accomplished years ago with conventional gear cutting lathes. Computer aided machinery will only speed up this manufacturing process.

In order to better illustrate the significance of the torque conversion efficiencies of the three reciprocating combustion engines discussed, approximate calculations of piston power stroke conversion to rotary motion, friction and heat losses and effective moment arms of the piston connecting rod to the three types of rotary conversion are show in Tables 1 and 2 below.

A conventional, non-offset crankshaft engine was analyzed for each 15 degrees of crankshaft rotation, with the connecting rod being equal to 1.25 times the stroke. Published efficiencies of new engines are rated at 34% of the BTU input.

Although the loss of connecting rod vectored thrust to the crankshaft was only 4 percent, the loss of effective moment arm was 46 percent. Since a 6 inch stroke engine must have a 3 inch radius crankshaft, the effective radius during 180 degrees rotation during the power stroke was only 1.62 inches. The resulting torque delivered to the crankshaft was 50.8 percent of that available by a gear driven engine as described by this invention. The cam driven engine will achieve 70.7 percent of the available torque due to the approximate 45 degree angle between the cam roller of the piston and the sinusoidal cam itself.

The geared reciprocating engine will, by theoretical comparison, develop 127.3 percent of the available torque die to the fact that the gear pitch diameter is 1.273 times the stroke of the engine, and zero "side" loads are eliminated. Thus the geared engine has a potential of developing far greater torque than the comparative engines studied, with the efficiency of the geared engine approaching that of very efficient electric motor.

TABLE 1

ENGINE HORSEPOWER EFFICIENCY
4 CYCLE RECIPROCATING COMBUSTION ENGINES

| ENGINE | *PISTON TO DRIVE SHAFT EFFICIENCY | FRICTION LOSS | HEAT LOSS | ESTIMATED EFFICIENCY |
|---|---|---|---|---|
| CRANKSHAFT | 51.00% | 8.50% | 8.50% | 34.00% |
| CAM DRIVEN | 70.70% | 3.50% | 7.00% | 60.20% |
| GEAR DRIVEN | 100.00% *Theoretical | 2.00% (estimated) | 6.00% (estimated) | 92.00% |

*Note:
1953 Certificated cam aircraft engine developed
210 Horsepower and 600 ft. pounds max. torque:
Torque/HP = 600/210 = 2.86 vs. 2.89 calculated

TABLE 2

ENGINE TORQUE EFFICIENCY
4 CYCLE RECIPROCATING COMBUSTION ENGINES

| ENGINE | POWER STROKE PER 720 DEG. ROTATION (RPM) | PISTON FORCE X MOM. ARM (relative) | TORQUE CONVERSION EFFICIENCY (less frict) | Relative torque efficiency factors |
|---|---|---|---|---|
| CRANKSHAFT | 1.00 | 0.490 | 0.490 | 1.00 |
| CAM DRIVEN* | 2.00 | 0.707 | 1.414 | 2.89 |
| GEAR DRIVEN | 2.00 | 1.273 (calculated) | 2.546 | 5.20 |

*Note:
1953 Certificated cam aircraft engine developed
210 Horsepower and 600 ft. pounds max. torque:
Torque/HP = 600/210 = 2.86 vs. 2.89 calculated Rotary valves are very desirable in reducing the multiplicity of valves, valve seats, springs, rocker arms with cams and camshafts, comprising many pieces per cylinder head to only one basic operating part, per cylinder.

The spherical rotary valve consists of basically one moving part, and solves the inherent problem associated with large flat, conical, unsealed rotary disc valves previously attempted. It is well known that flat, circular rotary valves work well in small model aircraft and motorbike engines due to the fact that the bypass losses are not critical in small bore engines.

The use of a perfectly machined sphere rotating in a lower base of concentric circular (piston-type) rings is comparable to the perfected use of piston rings now employed in all cylinders of modern reciprocating engines. However, in the spherical rotary valve, the sealing rings are not subject to the incredible reciprocating action of the piston of the cylinder. The sphere always rotates in the same direction and at the same rotational speed, considerably reducing the wear on the sealing rings.

The opening of the sphere, with a specially curved interior baffle, is located just above the top of the sealing rings, and is supported by a unique "donut" type of cylinder head ring. This feature solves the critical sealing dilemma associated with un-sealed, sliding-surface rotary valves.

The resulting flow of exhaust and intake gases is improved substantially over that of the typical plunger type of reciprocating mushroom cylinder valve. In the spherical rotary valve, the interior three dimensionally curved baffle directs the intake and exhaust gases to form a very smooth laminar flow turn as opposed to the multiple reversal of the highly turbulent flow required in and around the geometry of a mushroom shaped valve.

Improvements in exhaust gas scavagening with the addition of supercharged inlet ports will reduce emission of undesirable combustion products that are of an environmental concern, as well as increasing the fuel efficiency of the engine.

The use of modern fuel injection will allow the supercharged inlet air to scavenge burnt exhaust gases on the intake stroke without loss of fuel.

PRIOR ART LISTING

The following U.S. Patents are listed for reference to non-previous art teachings, and in the case of the reciprocating transmission to rotary torque teachings, all are of either the sinusoidal cam effect or some type of the inefficient "swash-plate" configuration. All of these require a major portion of the mean effective pressure of the piston power stroke to be dissipated in the resolution of the angular connecting rod force to the crankshaft vector solution.

The exception is Williams U.S. Pat. No. 5,228,415 of July 1993, which is a unique type of multiple pinned crankshaft which still consumes a significant lateral force and transmits side friction to the pistons. Asaga, U.S. Pat. No. 3,945,359 of March 1976 claims pairs of single-sided crankshafts with connecting rod piston arrangements included with a cylindrical rotary valve between four cylinders. This engine develops side thrust at the cylinder walls similar to any crankshaft engine, and does not teach the use of concentric piston-ring type of rotary valve seals.

Braun, U.S. Pat. Nos. 3,610,214 and 3,853,100 utilize a "free-piston" rack and pinion drive in an opposed air-compressor engine. This is not a true engine in comparison to all engines listed below, since it only produces compressed air or gas, with no rotational torque power-take-off shaft.

The twin pinions of the Braun "engine" oscillate clockwise and anti-clockwise with every cycle and are not connected to rotary power shafts. The mechanism for reversing the reciprocating piston depends on a mass weight synchronization device which appears to absorb a great deal of energy to effect the reversal of the pistons. This Patent does not illustrate rack and gear pinions that always rotate at a constant speed, clockwise, as a means for rotary torque power-take-off shafts. The subsequent Braun patent attempts to solve the "knocking-piston-to-cylinder affair that has been the bane of state-of-the-art "free-piston" engines.

None of the other U.S. Patents listed below teaches the use of an alternating-toothed rack and segmented circular pinion gears with one pinion above and two pinions below, limited in stroke by "anti-knock" twin oscillating arms carrying two pairs of limiting, reciprocating-reversal crank arms mutually attached on either side of the rigid gear shaft connecting the twin pistons. The vector component of the power stroke of the geared reciprocating engine is directly along the centerline of the cylinders due to the arrangement described above.

None of the prior art listed below attempts to eliminate the lateral force component of the driven pistons against the cylinder walls of the engine.

Prior art in reference to transmission of reciprocating pistons to rotary torque, limited to crankshaft, multiple cam drives or "swash" plates:

| | | |
|---|---|---|
| 2,776,649 | 1/1957 | Fenske |
| 2,994,188 | 8/1961 | Howard |
| 3,396,709 | 8/1968 | Robicheaux |
| 3,385,051 | 5/1968 | Kelly |
| 3,610,214 | 10/1971 | Braun |
| 3,805,749 | 5/1974 | Karlan |
| 3,853,100 | 12/1974 | Braun |
| 3,386,425 | 6/1968 | Morsell |
| 3,598,094 | 9/1971 | Odawara |
| 3,673,991 | 7/1972 | Winn |
| 3,895,614 | 7/1975 | Bailey |
| 4,084,555 | 5/1978 | Outlaw |
| 4,090,478 | 5/1978 | Trimble |
| 4,510,894 | 5/1985 | Williams |
| 4,515,113 | 5/1985 | DeLorean "Swash Plate" |
| 4,565,165 | 1/1986 | Papanicolaou |
| 4,635,590 | 1/1987 | Gerace |
| 4,974,555 | 12/1990 | Hoogenboom |
| 5,016,580 | 5/1991 | Gassman |
| 5,031,581 | 7/1991 | Powell |
| 5,140,953 | 8/1992 | Fogelberg |
| 5,228,415 | 7/1993 | Williams |

In regards to roller cam or swash-plate driven engines with rotary valves, none of the patents cited below teach the use of a rotating spherical ball valve with piston type sealing rings separating the compression and power stroke gaseous expansion flow from the critical sliding interstices leading to intake and exhaust porting.

Karlan, Asaga and Kossel utilize cylindrical, interior rotary valves at the centerline of barrel-type engines, with the ports located normal to the drive shaft. None of these teach the use of sealing rings at the critical intake and exhaust ports during the compression and power strokes. The earlier Karlan and the later Williams teach the use of flat disc valves with the port openings parallel to the drive shaft, both of which are unsealed.

Pellerin teaches the use of a unique "bell" valve and has a side mounted port that cannot be readily sealed, and the opening at the top of the bell for the spark plug is critical. Usich incorporates the final, certificated, U.S. C.A.A. Hermann Cam engine design with a conical set of rotary valves at each end of the well known "Dynacam" barrel engine, resulting in a modified sliding, unsealed kind of "flat" rotary disc valve.

The critical factor in all of these rotary valves is that they depend strictly on the close fit of the rotary valve face to the cylinder head or cylinder side. In any engine in excess of about 5 horsepower, the "blow-by" of compression gases and the power stroke explosion allowed by leaking rotary valves is very dangerous. It is similar to having an engine with a "blown" gasket or an unseated valve. Exhaust gases blown back into the intake will normally cause engine failure within a short period of time due to poor combustion, fire, or untimed detonation. This is obviously the reason that none of the rotary valves cited are found in engines in commercial use today.

Prior art listing of U.S. Patents with cam drives and unsealed rotary valves:

| | | |
|---|---|---|
| 2,783,751 | 3/1957 | Karlan |
| 3,456,630 | 7/1969 | Karlan |
| 3,805,749 | 5/1974 | Karlan |
| 3,945,359 | 3/1976 | Asaga |
| 4,313,404 | 2/1982 | Kossel |
| 4,515,113 | 5/1985 | DeLorean |
| 4,516,536 | 5/1985 | Williams |
| 5,076,219 | 12/1991 | Pellerin |
| 5,103,778 | 5/1992 | Usich, Jr. |

None of the above teach the use of a completely rotating spherical ball valve with multiple, concentric piston-type sealing rings integrated into a "donut" type of partial cylinder head. The use of an integral concave baffle to smooth the intake and exhaust gas flow has not been found in the prior art, nor has the use of air or water to cool the interior of the spherical valve from the concentric shaft of rotation.

SUMMARY OF THE INVENTION

The invention consists of a novel method of converting reciprocating piston motion into rotary torque in opposed cylinder combustion engines with a novel method of valving at the cylinder heads.

The twin cylinders are aligned on one axis with a pair of twin pistons connected by a rigid shaft reciprocating on the same horizontal axis as the cylinders. The rigid shaft is of a multiple extruded "U" shape which carries slightly curved rack gears, above and below the axis, that mesh with companion pinion gears also above and below the axis of the cylinders.

The upper and lower pinion gears are laterally displaced from each other, with the upper gear above the center of the axis while the twin lower gears are in pairs, on either side of the center gear, preferably below the axis of the cylinders.

The pinion gears are supported by large diameter, hollow drive shafts at the center of the pinion, at a radius of 2/Pi times the stroke of the engine above and below the cylinder axis. The pinion gears are not fully toothed, with each quarter of each gear receiving 90 degrees of gear, an empty space for 90 degrees and another toothed quarter opposite the first set of gear teeth.

The length of the rack gears and the quarter circumference of the mating pinion gears are equal to the exact stroke of the engine design such that the pinion gears have a pitch diameter of 4/Pi times the stroke.

The upper pinion gear rotates clockwise from the power stroke of the right piston moving to the left, while the twin, laterally displaced lower pinion gears are similarly driven clockwise when the piston returns from left to right.

The curved rack gears are independent of each other and are pinned at the center of the rigid shaft with the rack for the upper pinions at the center of the cylinder axis while the rack gear for the lower pinions are preferably below the cylinder axis and laterally displaced on either side of the piston shaft.

In order to have the upper and lower pinions engage their respective racks at the reversal of travel of the pistons, the racks are curved and hinged at the center of the piston connecting shaft and are tilted up and down a few degrees to properly engage their respective segmented pinions at the precise moment of the "top" and "bottom-dead-center" reciprocation of the pistons.

This feature is accomplished by cam arms and rollers on the reverse side of the curved racks which engage properly designed gear lobes on the upper and lower pinion segmented gears. Thus the upper rack is rocked into place by cam action against the lower pinions while the lower racks are preferably rocked into position by cam action against cam lobes machined onto the upper segmented gear pinions.

The smooth reversal of the pistons at the point of reciprocation is caused by an independent set of twin oscillating arms, on each side of the piston shaft, with pairs of rotating crank arms at each end. The oscillating arms are pinned at the center of the cylinder vertical and horizontal axes, and oscillate some 12 degrees up and down while their pairs of crank arms rotate a full 360 degrees for each full reciprocation of the pistons. The effect is similar to that of a crankshaft, and is more compact with the reciprocating stress equally divided between each side of the oscillating arms and each set of twin pairs of crank arms. The reciprocating force is thereby split into four structural elements, reducing their size. This feature eliminates any major stress on the first teeth of the segmented pinion gears and their racks, and provides for a smooth continuous rotation of upper and lower segmented pinions without overstressing the gear teeth.

The upper and lower pinions, laterally displaced with pitch diameters at the exact centerline of the piston travel are rotated in unison, both clockwise, by means of synchronizing slave gears at the forward and aft ends of the engine.

Thus the segmented pinion gears can be designed to run smoothly as if there were no segmented gaps in the upper and lower teeth due to the independent mechanical reciprocating crank arms on either side of each piston shaft, and rotated at the same speed, in the same direction, by synchronizing gears at both ends of the engine.

The features described above provide a constant eccentricity from the piston shaft to the centerline of the twin, large diameter upper and lower pinion drive shafts which run continuously through the engine driving from two to as many as 12 opposed pistons in a twelve cylinder engine. This constant eccentricity provide a torque factor from four to five times that of a conventional crankshaft engine, and eliminates all of the major reciprocating lateral "side" forces that are taken by the cylinder from the piston rings and skirts as required to solve the force vector system caused by the eccentricity of rotating crankshafts or sinusoidal cam drives.

The engine is aspirated with a supercharger blower which pressurizes a common plenum above the cylinder blocks and has cylinders that are charged with fresh pressurized air through a spherical "ball" valve that is a perfect sphere with a portion removed of preferably 128 degrees of interior truncation. The spherical valve is sealed by means of either vertical or horizontal circular "piston-type" piston rings that prevent blowback of exhaust gases into the intake.

The spherical valve rotates 360 degrees at the same rate as the pinion gearing to provide an intake cycle, a compression cycle, a power stroke and an exhaust cycle. The valve is preferably of similar diameter to that of the cylinder, allowing for an aspiration rate of nearly double that of an advanced 4-valve per cylinder engine.

The spherical valve has large diameter axles, or "ears" that are structurally sound enough to take all of the massive compression and power strokes of a combustion engine. With a few thousands of an inch diametrical clearance between the spherical valve and its housings, sliding friction between the spherical valve and its housing is eliminated. These axles may also carry cooling air or coolant fluid for lowering the temperature of both the valve and the cylinder head.

The circular type piston rings are carried by a conical, truncated, "donut" ring which is machined to receive the sealing rings and reduce the amount of compressive force on the valve, as the opening of the conical ring is preferably 64 percent of the diameter of the cylinder bore and preferably 55 percent of the area of the cylinder.

The spherical valves, in a multiple opposed cylinder engine may be driven by a common shaft on each bank of cylinders, requiring very little horsepower to be forfeited by the engine due to the low friction of the bearings, lack of sliding friction, and lack of cams, cam rollers and multiple high strength valve springs.

The shape of the spherical valve aperture and its companion intake and exhaust valves provide for a very smooth laminar flow of intake and exhaust gases when compared to the multiple undulating motion of these same gases around a conventional set of mushroom valves, and the volume of intake and exhaust gas may be calculated to comprise twice that of a conventional valve system.

The geared reciprocating engine, due to its 4/Pi times the stroke pinion diameter, rotates one revolution for each four cycles of each cylinder. Thus a four cylinder engine may have four strokes per drive shaft rotation and an eight cylinder engine may have eight power strokes per shaft rotation.

Either the upper or lower shaft may be used as the Power-Take-Off means. The synchronizing center gear may also be used for the drive shaft PTO. Further, a set of additional gears at the rear of the engine can provide for the inclusion of an interior, concentric, counter-rotating power shaft inside the upper segmented pinion drive shaft. This eliminates the complicated reverse mechanisms usually required in the hubs of the highly desirable counter-rotating propellers for aircraft and marine use.

The advance in the state-of-the art of combustion engines by the geared reciprocating engine utilizing segmented multi-gear-driven rack and pinion drive shafts with independent translating crank arm returns, having cylinders supercharged with a one unit spherical ball valve train for each opposed cylinder bank, deserves the broadest interpretation of the following claims as to the significant technological advances taught here, in the primary inventive realm that has seen only small, incremental improvement during the last century of the Otto cycle engine development.

There have been no known, successful attempts to completely eliminate the side thrust transmitted by reciprocating pistons in a crankshaft or cam driven engine by using a geared mechanism other than the "Wankel" engine which is limited in diameter and horsepower due to the tip and side sealing problems with the epicentric rotor.

The advantage of sliding rotary valves providing better engine aspiration is well known, however the sealing problems have heretofore prevented this development from being a factor in commercial use, and the introduction of a truncated spherical ball valve in this application may be noteworthy.

These engines are of very compact, and are slim and flat in design. They are ideal for both automotive and aircraft use. The small 90 horsepower automobile engine with 330 foot-pounds of torque measures only 26 inches square with a height of 16 inches. The larger, high horsepower aircraft engines will nest easily between twin spars of advanced composite aircraft so as to provide a very low drag engine "nacelle" in a pusher configuration, of less than half the protruding profile of a conventional turbo-prop engine.

BRIEF DESCRIPTION OF THE DRAWINGS

FIG. 9. Right piston at top dead center (TDC) at end of compression and commencement of power stroke. Left piston at bottom dead center (BDC) at commencement of exhaust stroke. Upper rocking rack gear and upper pinion 10 will power upper drive shaft 11 in motion of twin pistons from right to left.

FIG. 10. Right piston at half power stroke with left piston at half compression.

FIG. 11. Right piston at end of power stroke with left piston at end of exhaust stroke, with lower pinion 13 about to engage lower rack 19 with piston motion in left to right motion.

FIG. 12. Half exhaust stroke of right piston with left piston at one half intake stroke.

FIG. 13. Right piston at completion of exhaust stroke with left piston at bottom dead center of intake stroke.

FIG. 14. Right piston at half intake stroke with left piston at one-half compression stroke.

FIG. 15. Right piston at bottom dead center of intake stroke with left piston at full compression and at top dead center of commencement of power stroke.

FIG. 16. Right piston at middle of compression stroke with left piston at middle of power stroke, with lower rack and pinion driving the lower drive shaft with the left to right motion of the pistons.

FIG. 17. Completion of the four cycle movement at full compression, with one complete clockwise rotation of both upper and lower drive pinions, similar to the FIG. 9 schematic.

FIG. 19*b*. End view of centerline synchronizing gears and drive arrangements for left and right spherical valve units and counter-rotating upper concentric shaft.

FIG. 20*a*. Typical segmented gear pinion drive part.

FIG. 20*b*. Typical arched rack gear part with integral cam arms.

FIG. 20*c*. Typical twin piston part with extruded triple "U" rigid connecting shaft.

FIG. 20*d*. Oscillating arm part with 360 degree rotational crank arms.

DESCRIPTION OF THE PREFERRED EMBODIMENT

Figure 1:
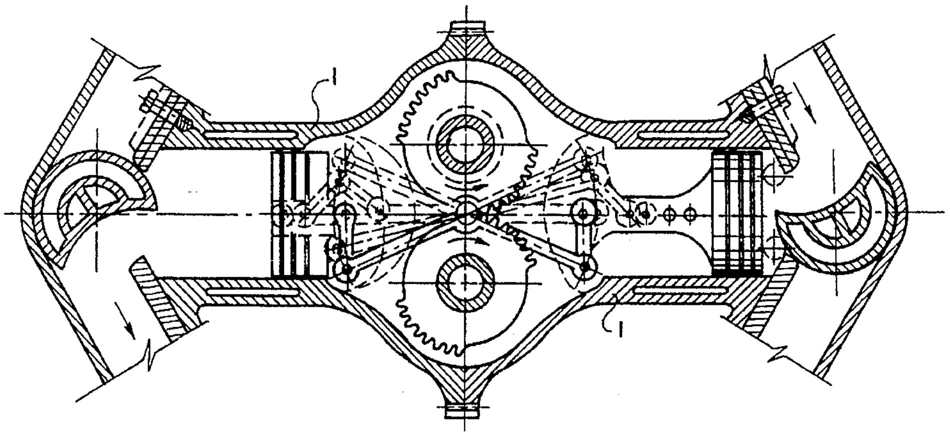
FIG. 1. General Arrangement of the Engine through a cross section taken at the centerline of the cylinder on the "stroke" axis. The parts numbers are omitted for clarity. The right piston is in the intake cycle while the left piston is in the exhaust mode as can be noted by the arrows.
Figure 2:
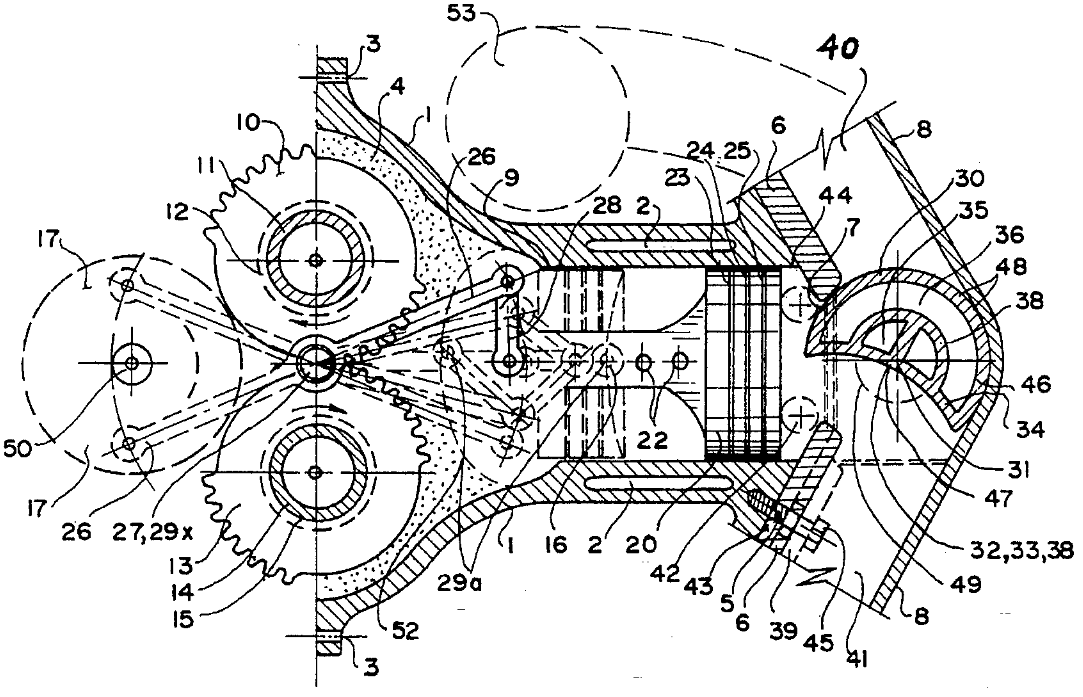
FIG. 2. Larger scale drawing of FIG. 1 of one-half of the engine with parts numbers, showing twin pistons, upper and lower pinions, and spherical valve sealing rings perpendicular to piston travel.

General Arrangement and Method of Conversion of Reciprocating Pistons to Rotary Torque In FIGS. 1 and 2, sections of the twin opposed piston and cylinders are shown. The cylinder headblock 1 is split at the center of the engine and thus becomes the crankcase half. Since the pistons and cylinders are on the same centerline, it is possible to make one casting serve for both left and right hand cylinder blocks.

This block is cast to accommodate two, four, six or eight cylinders for the manufacture of 4 to 16 cylinder engines. The invention described herein is a supercharged 3.5 inch bore by 3 inch stroke engine developing 90 horsepower and 330 ft. pounds of torque with 4 cylinders, and 180 horsepower and 700 ft. lbs. torque with eight cylinders. An 8 cylinder, supercharged engine of 7 inch bore and 6 inch stroke engine is estimated to develop 1300 horsepower and an excess of 4,000 ft. lbs. torque.

The engine may be air-cooled or constructed with a waterjacket 2. Centerline flanges and bolts 3 take the main stress of the compression and power strokes through integral bearing support diaphragms 4, which occur between cylinders to support the 5 main bearings required. Bolts 5 serve to connect the cylinder head valve "do-nut" ring 6 (which supports sealing rings 7) and spherical valve covers 8 to the cast and machined cylinder block 1.

Interior steel cylinder liners 9 may be sweated onto the cylinder walls of the cylinder block 1. The segmented, upper pinion gear 10 is keyed into the hollow large diameter, upper pinion shaft 11 which is supported by the upper pinion bearing and support 12. The bearing is supported by twin halves of the cylinder block diaphragms 4.

The thinner, twin, lower segmented pinion gears 13 are keyed into the lower power shaft 14 and supported by roller bearings 15 supported by diaphragms 4, as shown in FIG. 2.

In order to coordinate the rotation of the upper thick pinion gear 10 with the twin, lower, thinner pinion gears 13, slave gears 17, left, and right, are used at the front and rear of the cylinder blocks for this purpose and to synchronize the upper power shaft 11 with the lower pinion power shaft 14. This is necessary as the segmented upper and lower pinion gears have gear teeth missing at each successive quarter of their circumference. The twin lower gears 13 rotate clockwise as do the upper drive segmented pinion gear 10. The slave gears 17 synchronize the drive pinions by an equal, intermeshing counter-clockwise rotation.

The reciprocating action of the pistons 20 and 21 is converted into constant rotary torque by means of the right piston 20 driving its rack and pinion gear to the left, (clockwise) while the lower twin pinion gears are driven (also clockwise) by piston 21 returning from left to right. This is accomplished by means of a multiple "U" shaped twin-piston connecting shaft 16 between the twin pistons 20 right and 21 left.

Figure 3:
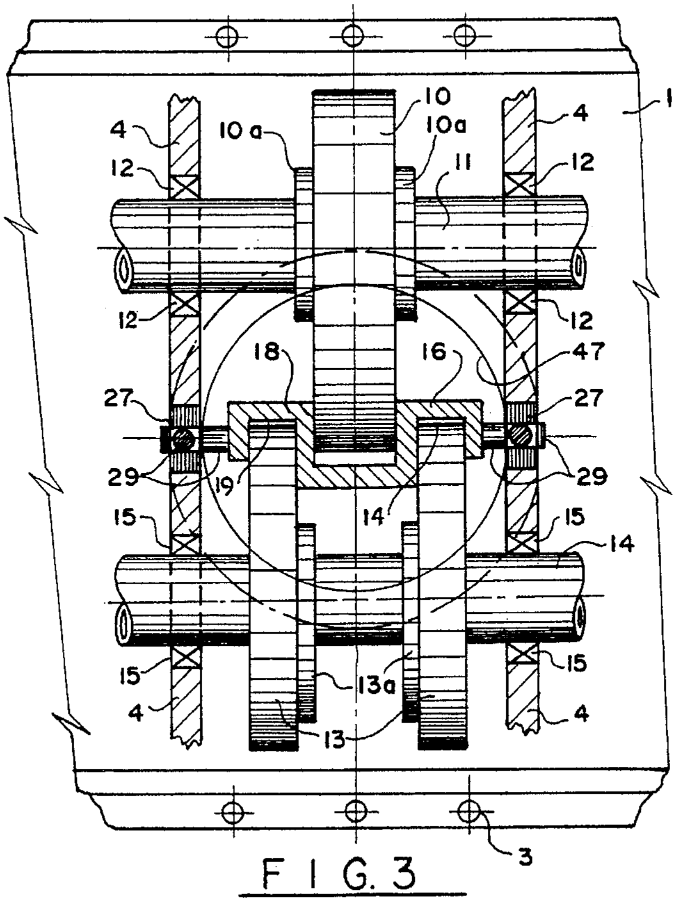
FIG. 3. Section through a cylinder through the cylinder bore axis.
Figure 5:
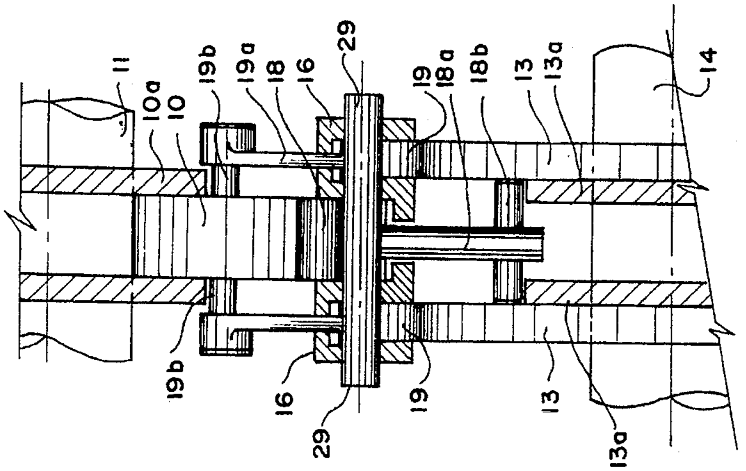
FIG. 5. Section through rocking rack gears and pinions, showing cam actuated rocking mechanism for both upper and lower units.
Figure 4:
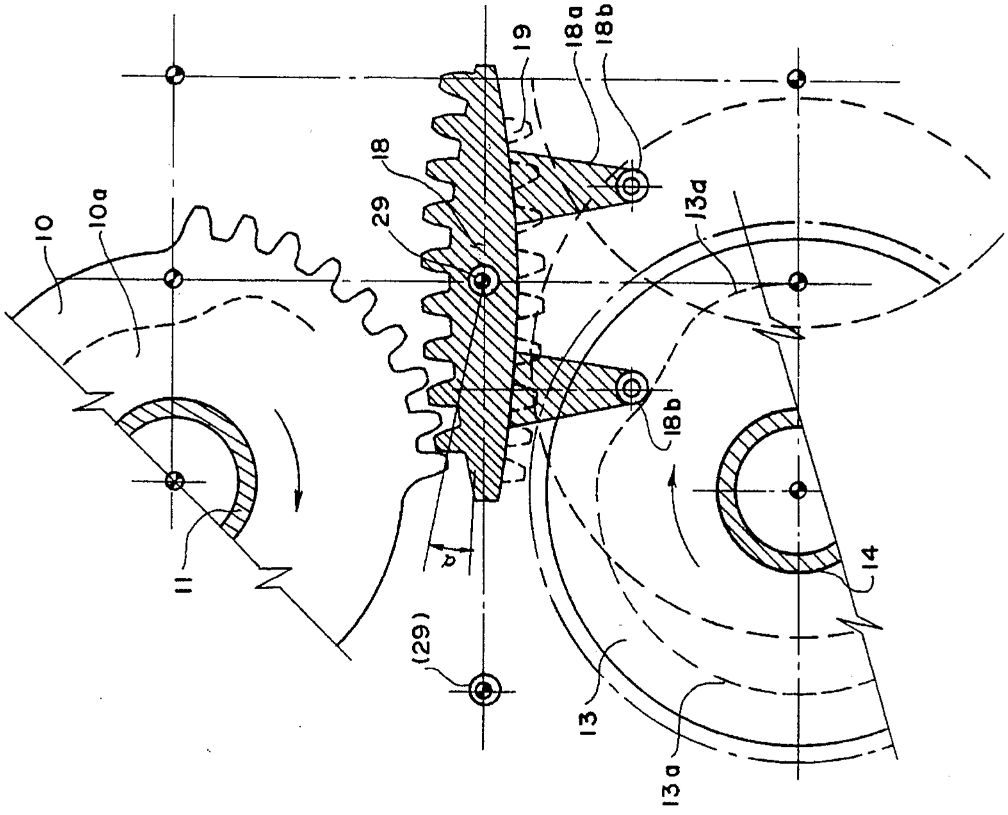
FIG. 4. Upper curved rack with upper pinion gear shown with cam-actuated rocking arms bearing on lower pinion gear cams.

In FIG. 3, the arrangement of the upper 18 and lower 19 pinion rack gears and their drive pinion gears 10 and 13 are shown laterally separated and nested into the triple U extruded piston shaft 16. In FIGS. 4 and 5, the single, upper segmented pinion gear contacts the rack gear teeth 18 which is constructed in an arc, and rocked directly into the upper pinion 10 precisely at the reversal of its direction. The piston drive stroke is transmitted by the piston connecting shaft 16 by the bearing pin axle 29 which is at the centerline of the piston travel through the opposed cylinders. In the same manner, the lower segmented twin pinion gears mesh precisely with the twin lower arched, rocking rack gear teeth 19 which are also connected by the center drive pin 29.

This is made possible by the extruded triple "U" shape of the connecting shaft 16. These gears are of hardened steel and are precisely located with the supporting axle 29. The mechanism used to "rock" the upper rack 18 and lower rack 19 as shown in FIG. 4 are cam arms 18*a* attached to arched rack gear 18, with twin cam rollers 18*b* which contact the proper geometry of the cam lobes 13*a*, which are integral with the twin lower segmented pinion gears 13. The lower rocking gear racks 19, of similar construction are rocked into correct position for interfacing with the lower pinion 13 by means of rocker arms 19*a* which ride on cam rollers 19*b* on the upper cam lobes 10*a* machined into drive pinion gear 10. Synchronizing gears 17, on each side of the drive shafts 11 and 14, are depicted in FIG. 2 are used to mate the independent upper 10 and lower pinion gear 13.

A relatively small oscillating motion of 6 degrees up and 6 degrees down, is minimally required to actuate the rocking racks 18 and 19 without clashing of the pinion gears. This is due to the alternating 90 degree segments of the gear teeth as shown in FIG. 2, as A, B, C, and D.

The method shown provides positive gear interface action without clashing since the cam rollers and the cam lobes may be designed to always provide a positive gear vector force component which is caused by the standard 14.50 degree rack and pinion gear teeth interface.

Obviously there are other methods that may be used to accomplish this function, such as ratcheting-one-way gear segments and segmental hinged racks. However, the preferred embodiment has the potential for smoothly intermeshing the segmented gears with a positive vertical gear meshing force which is necessary for smooth running gears. The very small normal, or vertical force required to mesh the gears is provided by the upper and lower drive shafts through the pinion gears and their respective cam lobes. This force is constant, and in FIG. 4 is provided by the piston shaft 16, rack axle 29, and the rack cam arms 16*a* with cam rollers 16*b* acting upon the lower twin pinion cam lobes 13*a*.

Twin pistons 20 and 21 may be rigidly interconnected by the multiple "U" gear shaft 16 with double wrist pins 22. Piston rings 23, 24 and 25 are installed in the conventional manner. An oscillating arm 26 is carried by an independent support 27 and bearing which is supported by the integral diaphragm 4 of the cylinder block, with no component of the oscillating force taken by the pinion drive shafts. The oscillating arms 26 occur on each side of each piston pair, and each bearing shaft is connected to bearings and pins of the translational crank arms 28 which are connected to dual pins 29*a* and 29*b* of piston shaft 16. The purpose of the oscillating arms 26 on each side of the piston rack shaft 16, on separate support 27 and bearings 28 is to shorten the width of the entire opposed block by means of the translating crank arms 28 rotating 360 degrees both inside and outside of the radius of the oscillating arm 26. The right piston 20 is reversed by the retracted crank arms 28 and its pin 29*a*, while the left piston, at the same instant, is reversed by the left crank arms 28, fully extended and pinned to the left pins 29*b*.

In a typical reciprocating mode, the oscillating arms 26 will oscillate and reciprocate about 12 degrees up, and 12 degrees down, serving to allow the small crank arms 28 to effectively rotate about its end bearings 29*a* and 29*b*, smoothly reversing the rotation of the piston at the end of its travel in a totally independent mode from that of the alternating and segmented rack and pinion gear driving mechanism.

In this manner, each end of the oscillating arms will be working alternately in tension on the left, and compression on the right, with its short crank arm 28 length equal to precisely one half the length of the piston stroke between its bearings, saving space. Thus, four very small lightly stressed "crankshafts" are utilized to smoothly reciprocate the twin piston travel in a manner similar to that of the conventional crankshaft engine one drives each day.

However, the friction bearing force from this reversal of the twin reciprocating pistons does not cause friction on the independent upper and lower pinion drive shafts 11 and 14, either of which may be used as the main power-take-off drive shaft. Due to the reversing up and down positioning of the oscillating arm 26, the vertical force vector from the right arm to the left is effectively canceled. And, there is no eccentricity in the lateral direction due to the fact that each twin piston is cradled on each side with similar, equally stressed oscillating arms 26 and reversing cranks 28, rotating about and bearing on pins 29, 29*a*, 29*b*, on either side of the semi-rigid piston connection shaft 16. Further, the use of the oscillating arms 26 with the multiple crank arms 28 serve to produce a unique "dwell" at the top and bottom of the piston strokes which is very beneficial to the power stroke and the exhaust scavenging cycles.

Figure 6:
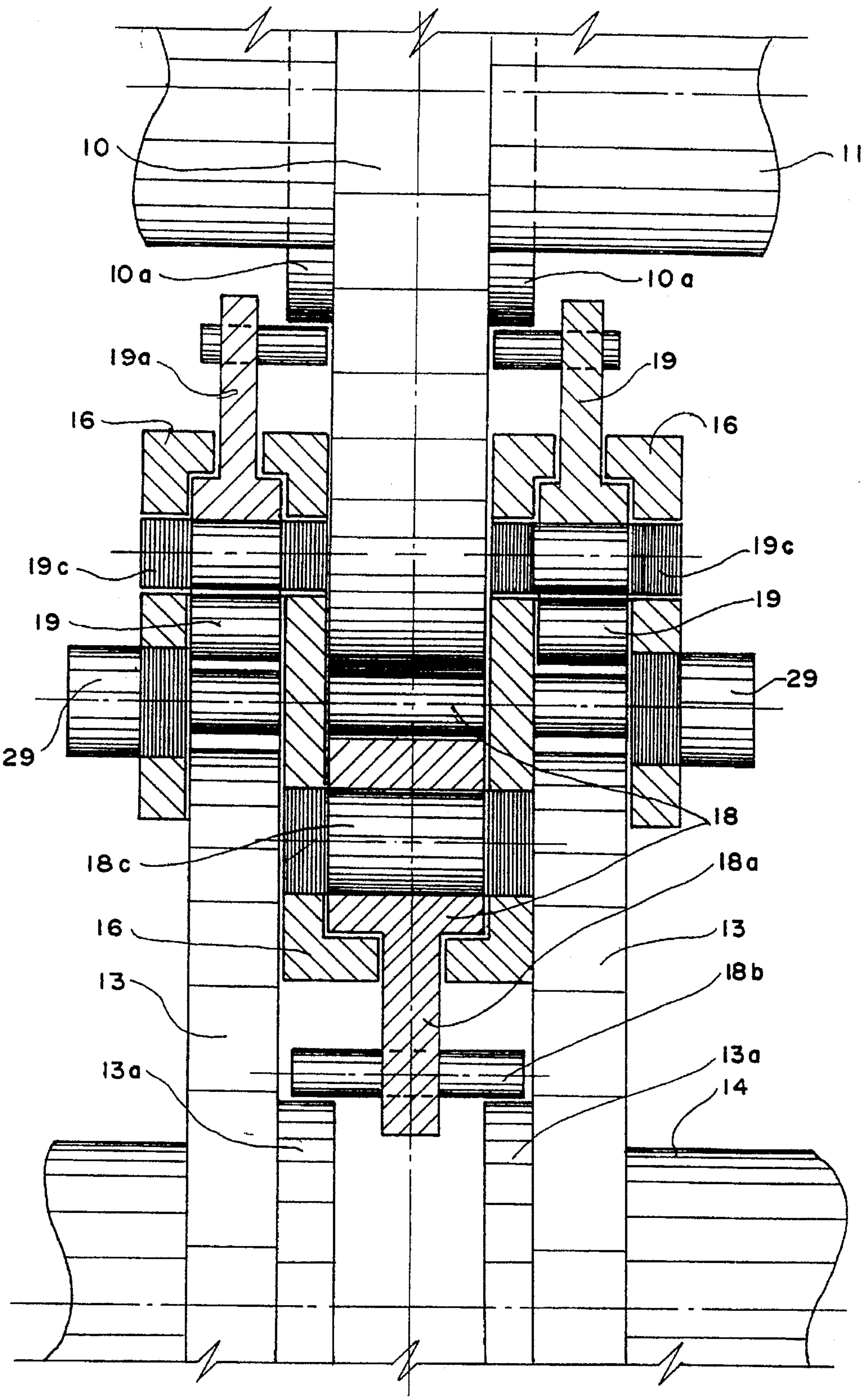
FIG. 6. Section through rocking rack gears and pinions with deeper extruded piston shaft for near-zero eccentricity.

In FIG. 6, a deeper triple "U" piston shaft is depicted which will allow the arched rack gears 18 and 19 to have their teeth contact their respective pinion gears 10 and 13 at a junction point that will drive their respective axles 18*c* and 19*c* directly at the centerline of the twin piston travel by means of pins 29 through its twin cylinders. Unlike the geometry developed in FIG. 3 this centerline-gear-thrust improvement will have the effect of eliminating all side thrust force on the twin piston during its power stroke travel through the opposed, inline cylinders.

In this instance, the small "normal" force required to intermesh the curved rack and pinion gear will be taken by the drive shaft bearings 11 and 14 and the small cam rollers on the cam lobes of pinions 10 and 13. This eliminates the "side" force of the piston rings against the cylinders, heretofore not possible in crankshaft or cam driven reciprocating engines.

Discussion of the Spherical Valve Design

Spherical ball valve 30 is shown in FIGS 1 and 2, 2*a*, and FIGS. 7 through 16. This is a complete, machined sphere which rotates about an horizontal axis 31, (parallel to the pinion drive shafts) on a hollow concentric shaft 32 supported by cylinder block bearings and supports 38 between cylinders as shown in FIG. 3. Spherical valve bearing shafts 32 take all of the power and compressive stroke gas loads through their twin bearings 38, which are part of the valve cover assembly 8.

An elliptical aperture 33 is formed by the concave baffle 34 with interior diaphragms 35 which form separate interior spaces 36 for the introduction of air or water cooling from the concentric hollow shaft 32. Apertures 37 allow cooling air or liquid coolant to enter and exit the interior of the valve 36 which forms the backside of the "hot" portion of the sphere that forms the top of the cylinder head during the power stroke at top dead center.

This feature is optional as the cooled, supercharged air from the intake 40 may be sufficient to fully cool the rotating valve during its 360 degrees of rotation during one four cycle combustion process.

The exhaust manifold port 41 is on the lower side of the engine while the intake manifold 40 is connected to a supercharged plenum 53 as shown in FIG. 2. Spark plug threaded inserts and fuel injection ports 42 are located at the top of the piston at full compression, and are accessible from the exterior of the cylinder block.

Gaskets 43 are used between the steel donut ring 6 and the cylinder block 1. Stainless steel "O" rings 44 are used to further seal the gap between the cast aluminum cylinder block 1 and the steel donut ring 6.

The piston-type sealing rings 7 supported by the donut ring 6 are just below the aperture 33 of the spherical ball valve 30 during the final compression and power strokes of the piston, thereby sealing the valve interstice and preventing exhaust gas blow-by into the intake manifolds.

Both the valve cover 8 and the donut ring 6 are secured by recessed bolts 45 and stainless steel O ring seal 44. The internally machined valve cover and integral intake and exhaust porting casting 8 is also secured with longer bolts 45 to flanges in casting 8 and anchored through donut ring 6 to the cylinder block 1.

Figure 8A:
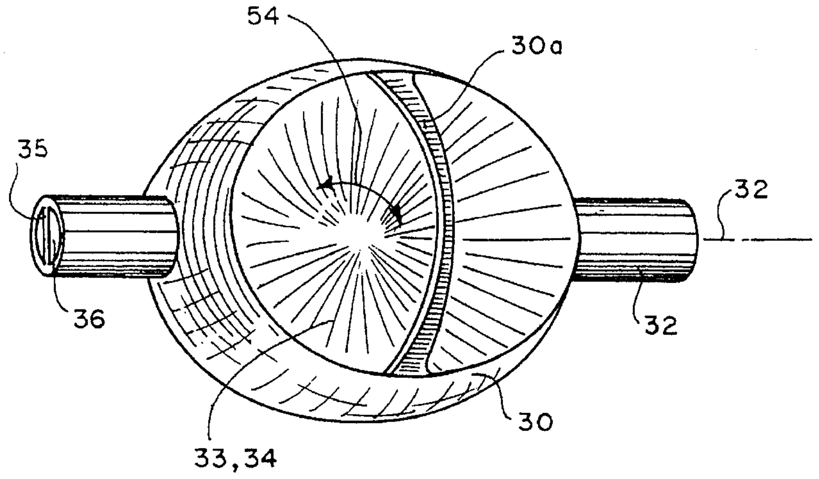
FIG. 8*a*. Spherical valve detail showing concentric
Figure 8B:
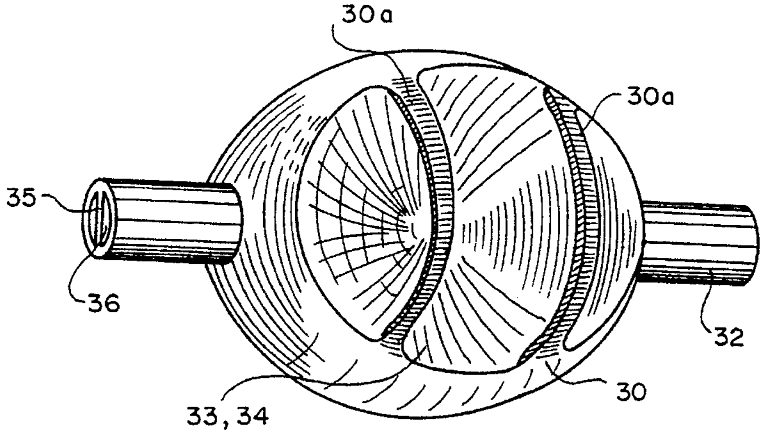
FIG. 8*b*. hollow shafts, FIG. 8*a* with one rib and FIG. 8*b* showing two ribs for maintaining position of valve sealing rings.

The diameter of the cylinder 47 is slightly greater than the diameter of the spherical valve 30 so that the ball valve can be inserted into the valve head 8 which is sealed by the truncated, conical donut sealing ring 6. The spherical valve drive shaft linkages are separate in order to facilitate this, and they may contain the directed flow axial diaphragms 35 as seen in FIG. 8*a*, to facilitate the inlet and outlet cooling flow inside the spherical valves. In FIGS. 8*a* and 8*b* the spherical valve is shown with one and two spherical "ribs" 30*a* designed to maintain the position of the sealing rings during intake and exhaust cycles. The internal diaphragms and baffles 34 and 35 serve to add the necessary strength to the unit to successfully span the distance between the shaft bearings 32 for the significant power and compressive gas forces exerted by a four cycle combustion engine.

Figure 2A:
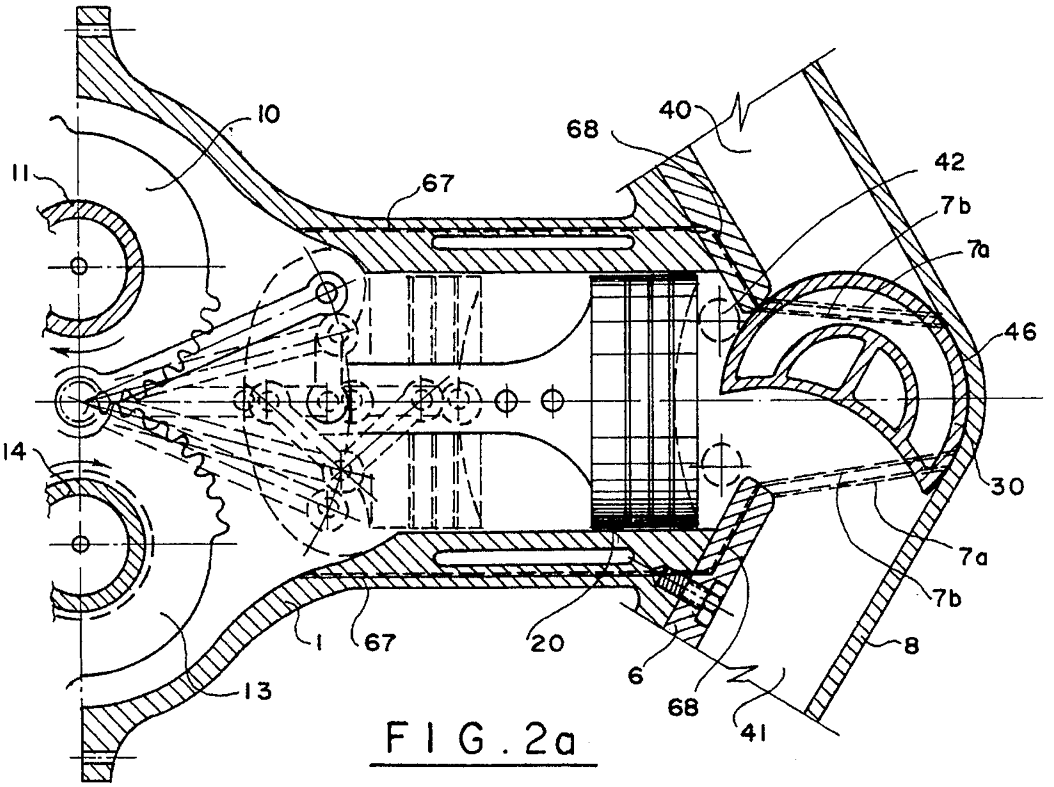
FIG. 2*a*. Detail of upper cylinder head with spherical valve sealing rings in a near horizontal arrangement.
Figure 8C:
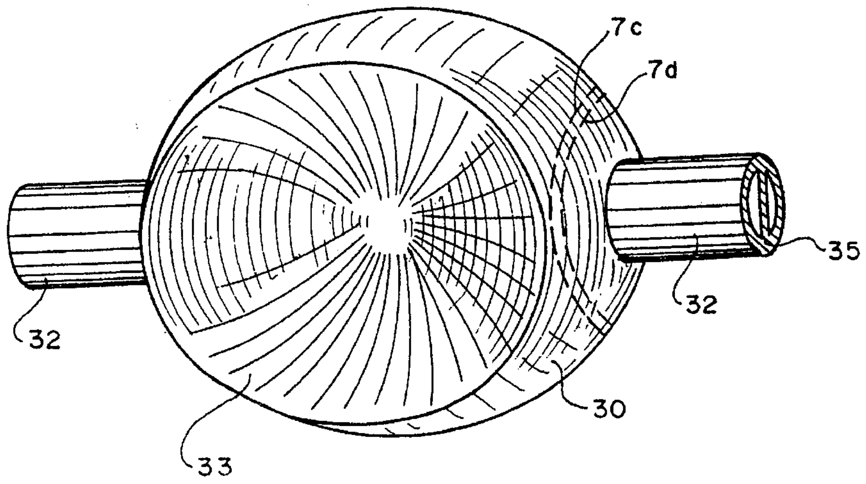
FIG. 8*c*. Spherical valve without ribs for use in cylinder heads with near horizontal sealing rings as shown in FIG. 2*a*.

In FIG. 8*c*, the spherical valve is shown without the central ribs as may be preferably used in the sealing ring configuration shown in FIG. 2*a*, with the sealing rings 7*a* and 7*b* in a near-horizontal position on either side of the cylinder. These rings seal the sphere along the lines shown as 7*a* and 7*b* which are the positions of sliding motion of the near-horizontal rings as shown in FIG. 2. This preferable sealing ring geometry provides constant contact with the sphere during its 360 degree rotation, and the sealing rings are not fully exposed as they would be as depicted in FIG. 2.

Thus the force to actuate the spherical valves is a fraction of that of a conventional "valved" engine, as there are no camshafts and valve spring forces to be driven with power diverted, and lost, from the drive shaft. The structure of the spherical valve 30 is such that the minimal diametrical clearance from the valve 30 to the valve cover surface 46 will be maintained without frictional contact.

The interior surface of the valve head 46 is machined to clear the top of the spherical valve 30 by a few thousands of an inch as seen in FIG. 2. Additional concentric sealing rings 48 similar to 7 can be employed at the top of the valve cover for additional spherical valve sealing if necessary.

Operation of the Engine

Figure 7A:
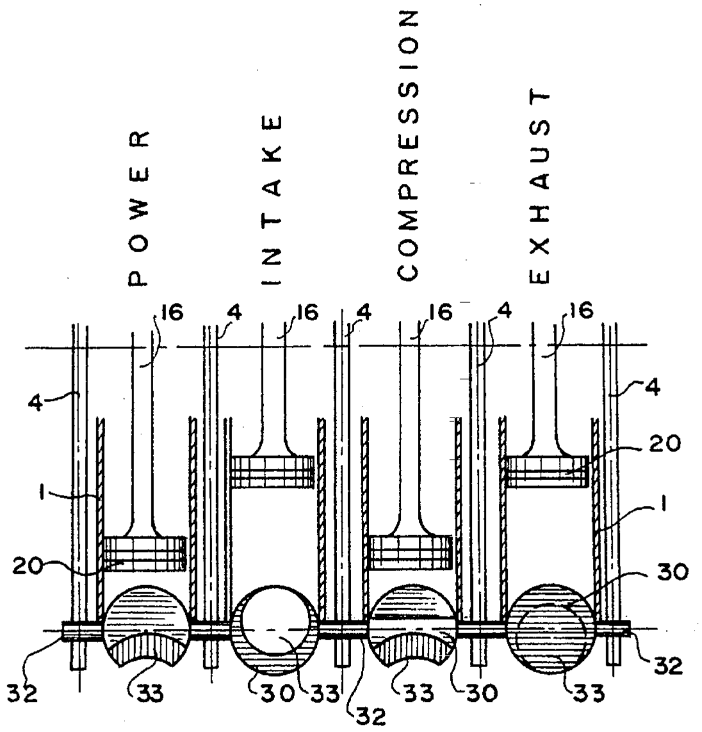
FIG. 7*a*. Schematic half-plan of 8 cylinder engine with relative position of valves.
Figure 7B:
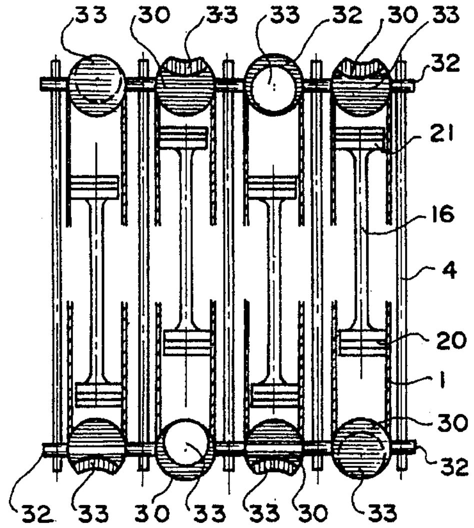
FIG. 7*b*. Schematic plan of 8 cylinder engine.

In FIGS. 7*a* and 7*b*, the piston travel and spherical valve rotation is shown in plan for an horizontally opposed 8 cylinder engine. FIGS. 9 through 17 show the complete workings of the engine through rotations of the upper and lower pinion gear drives for each 45 degree rotation of the pinions. The power mode centerline of the spherical valves is shown by the letter "P" which indicates the area inside the spherical valve that will serve at the closure of the top of the cylinder head during the compression and power strokes.

Figure 9:
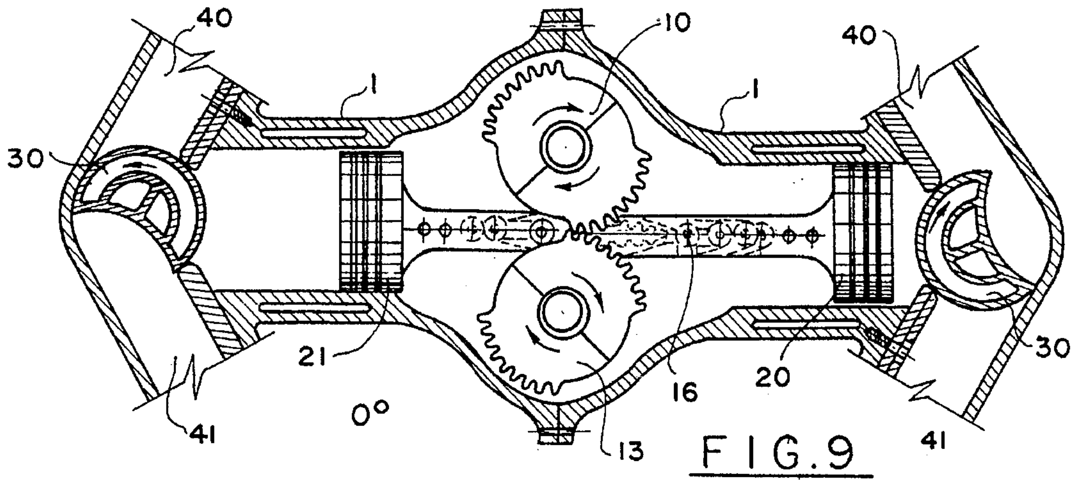
FIGS. 9–17. Schematic drawings of relative piston, valve, and upper and lower pinon gear relationship at 45 degree rotations of the upper and lower pinon gear drives, with translation and crank arms omitted for clarity.
Figure 10:
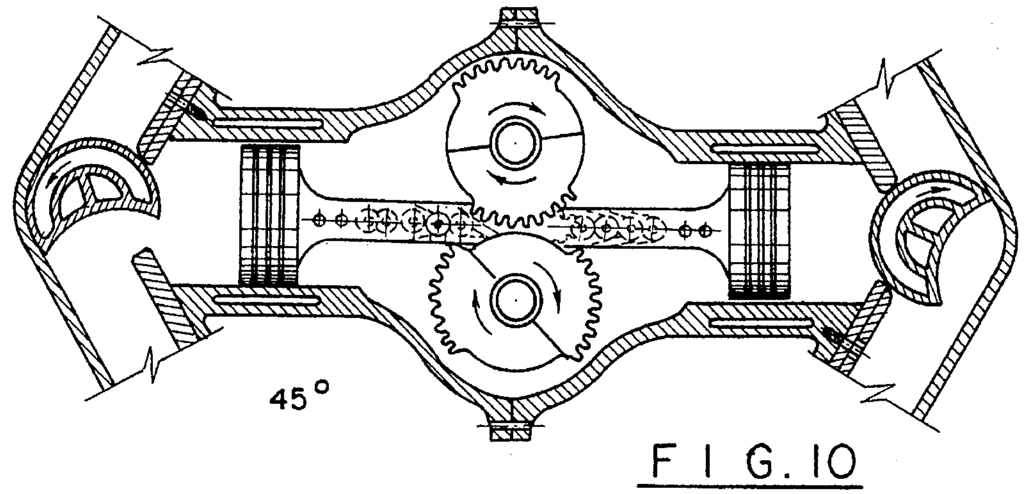
Figure 11:
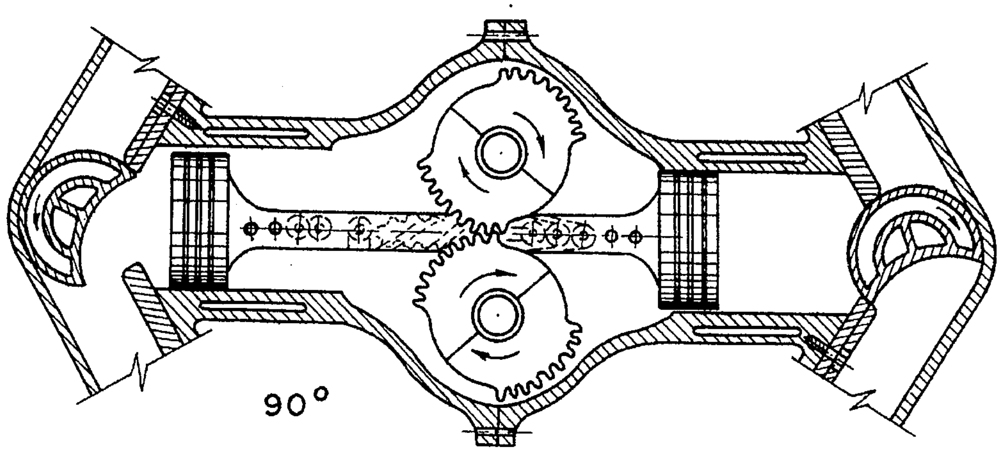
Figure 12:
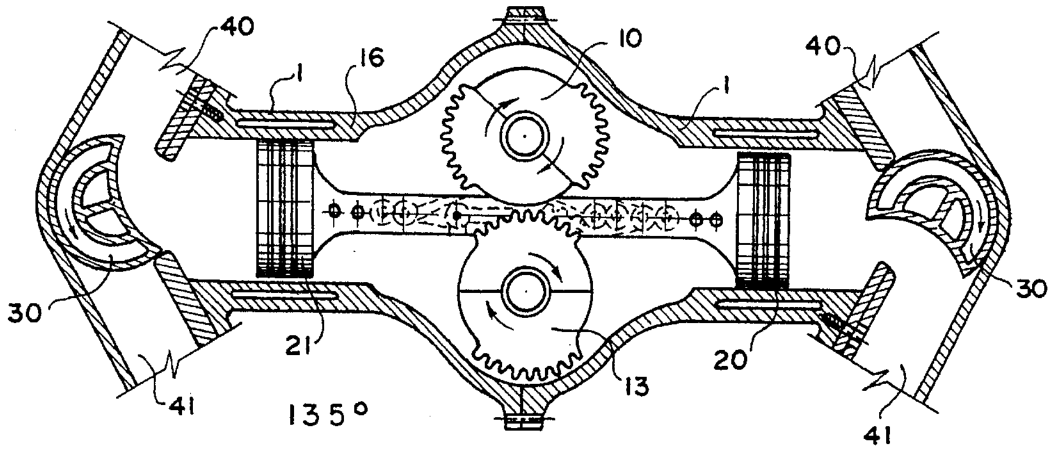
Figure 13:
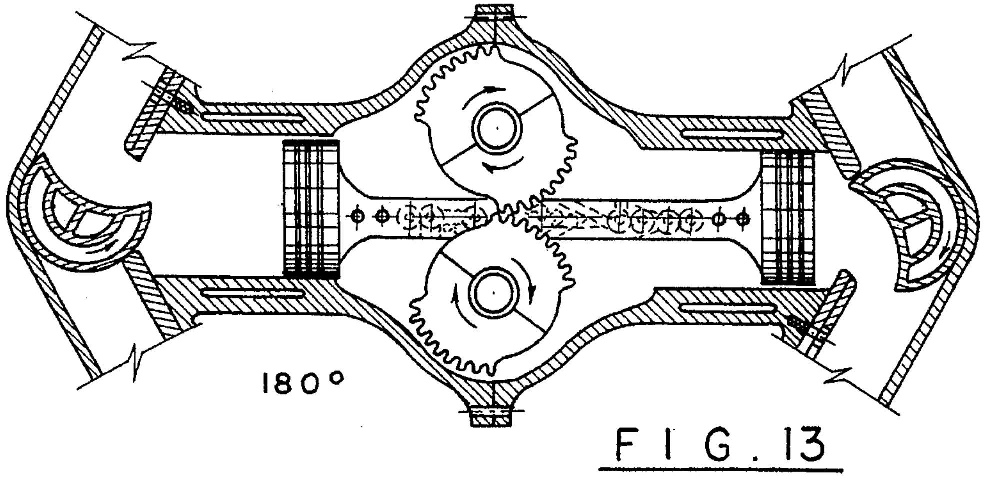

The cycle will start at 0 degrees at top dead center, as shown in the left cylinder in FIG. 9, with the power stroke completed at 90 degrees, as shown in FIG. 11. The exhaust stroke is completed at 180 degrees, as shown in FIG. 13, with additional scavenging taking place from 180 to 225 degrees, as occurs between FIGS. 13 and 14. The supercharged intake stroke further scavenges the exhaust gas and this occurs from 180 to 225 degrees, as can be observed between FIG. 13 and FIG. 14, and shown at 200 degrees in FIG. 18.

Figure 14:
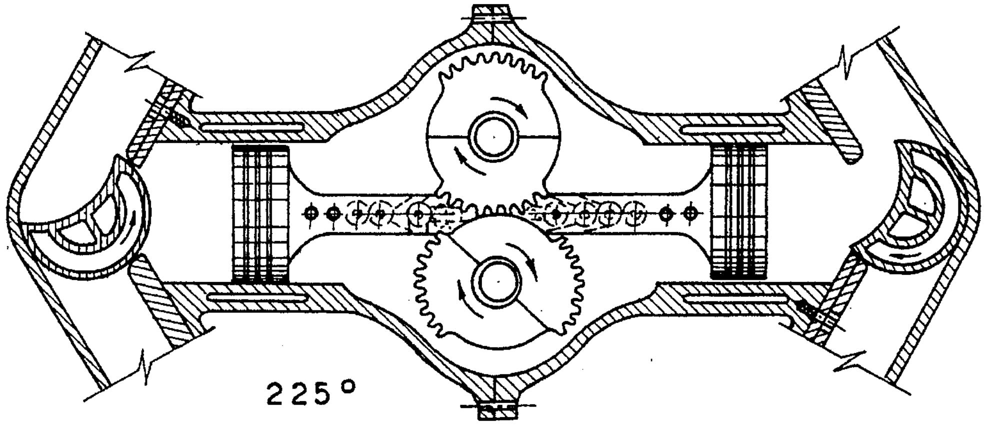
Figure 15:
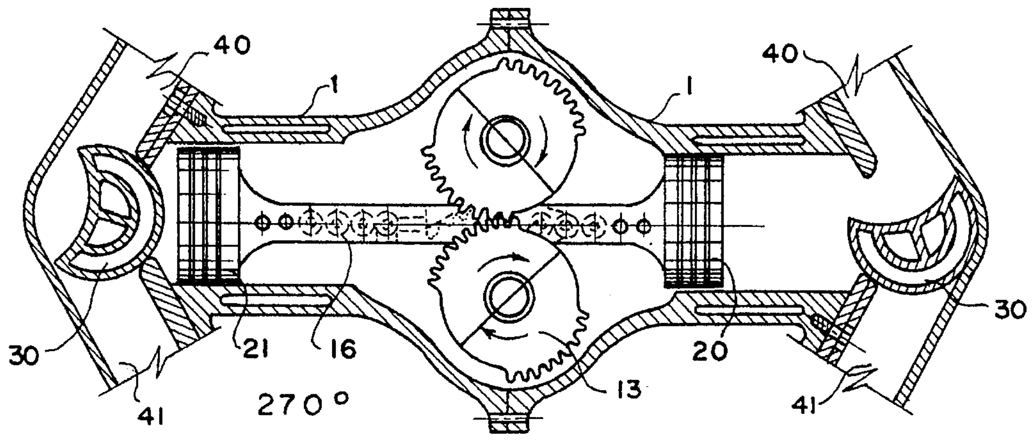
Figure 16:
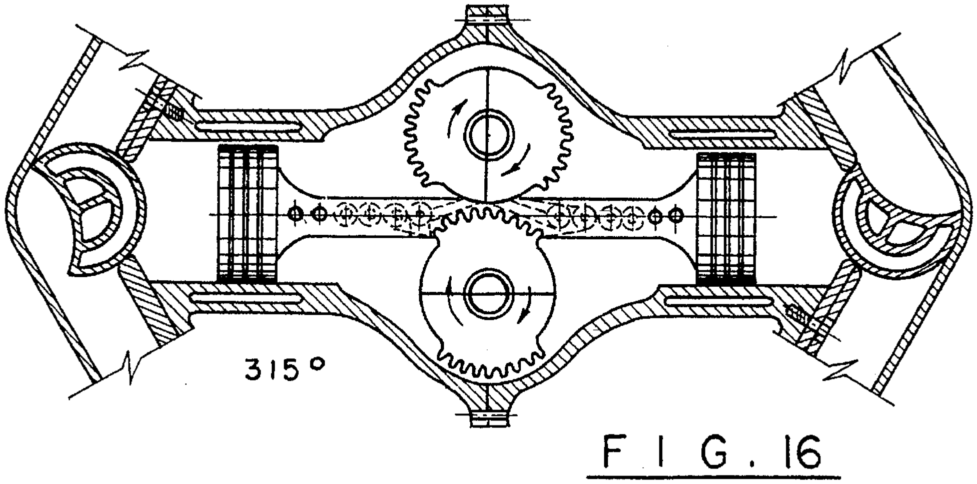
Figure 17:
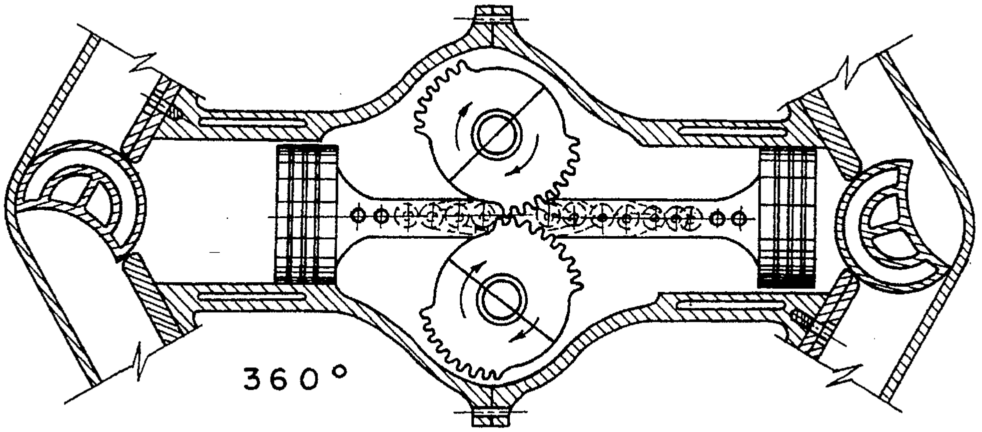

The intake thus begins in FIG. 13 and continues as shown in FIG. 14 at 235 degrees of drive shaft rotation. In FIG. 15, the intake is "overlapped" and the supercharged fresh air is used to provide compression in the cylinder for the next 45 degrees while in FIG. 16 the cylinder is closed by the spherical valve, and at 315 degrees the compression stroke is completed at TDC at 360 degrees or pinion shaft rotation as shown in FIG. 17. A 360 degree rotation and completion of the four-stroke cycle by the interconnected drive pinions 10 and 13 has been accomplished by the synchronizing, counterclockwise gears 17. The left gear 17 is shown in FIG. 2, and these units are in pairs at the forward and rear ends of the engine.

In a six inch stroke engine, with a 6 or 7 inches of cylinder bore, the power pinions will rotate 90 degrees each, per power, exhaust, intake and compression cycles. Thus the diameter of the power pinions will be precisely four times the stroke, with a diameter of 4/Pi or 1.273×the stroke.

A six inch stroke engine will therefore have a moment arm eccentricity of 3.819 inches, or 27.32 percent greater than a standard 3 inch radius crankshaft carrying a 6 inch stroke. An additional 0.65 inches will be added due to the thickness of the arched rack, as shown in FIG. 3, giving an eccentricity of 4.469 inches, or 48 percent greater than a crankshaft. (The alignment of racks and pinions in FIG. 6 does not provide additional eccentricity, however it completely eliminates side thrust on the cylinder walls from the pistons.)

Further, the eccentricity of both gear geometries will exist throughout the full 6 inches of power stroke as compared to 49 percent of that for a crankshaft design. The resulting torque will first be doubled by the four-cycles per rotation and then be increased by a factor of 1.48/0.49. The resulting comparative torque increase at equal piston speeds between a crankshaft engine and the geared engine, of equal displacement, will be (2.00+1.48/0.49) or theoretically, some five times that of a crankshaft driven engine.

Further increases can be had due to the fact that the geared reciprocating engine may have larger "oversquare" bore/stroke designs, (i.e. 7 inch bore with a 6 inch stroke), due to the freedom from the crankcase and connecting rod geometry. Frictional reduction will increase horsepower by 5 to 10 percent due to elimination of all sliding friction and crankcase bearing friction as normally seen in the significant lateral forces occurring twice per revolution per piston in a conventional crankshaft-driven engine.

Figure 18:
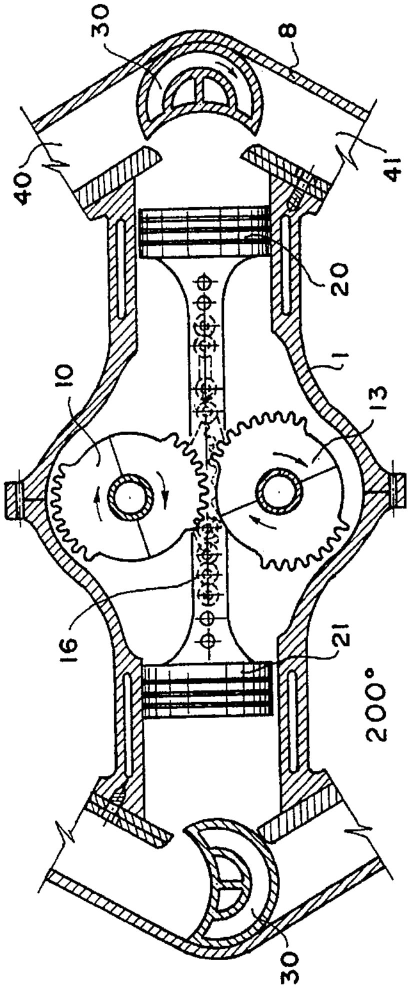
FIG. 18. Schematic view of pistons, gears, and spherical valve with right cylinder at 200 degrees of drive shaft rotation, showing scavenging action with both supercharged intake and exhaust ports partially open.

The engine by necessity is supercharged due to the position of the spherical valve at the intake mode. This is clearly shown in FIG. 15 at 270 to 315 degrees of drive shaft rotation. The valve allows supercharged air to scavenge the cylinder through the exhaust port for several degrees of power shaft rotation, as shown in FIG. 18 at 200 degrees of rotation. At completion of the intake cycle, the supercharged air is still being fed into the cylinder for one half of the compression stroke. This is seen in FIG. 15, 270 degrees. Thus the compression ratio of the supercharger must be on the order of 6 to 1 or 95 psia. The final compression takes place during the last half of the compression stroke which must take the compression ratio to a value of 10 or 12 to 1. FIGS. 9 to 17 indicates the relative positions of the piston travel and segmented gear rotations with the spherical valve rotation squence.

Dividing the four cycles into equal 10 degree segments of the 360 degree power stroke and spherical valve rotation, the power pinions (for a six inch stroke engine), each take 9 segments of 10 degrees each. Using a gear tooth spacing of ⅔ of an inch (of ⅓ inch root), nine gear teeth will be machined into each alternating quarter of the upper and lower pinions. The racks meshing with these "teeth" will be similar in size and shape and will be approximately 6 inches in circumferential length. Thus one gear tooth, for purposes of illustration, occupies 10 degrees of power stroke travel.

As shown in FIG. 2, 6 inches of each quarter of each pinion gear will function for each cycle. Quarters "C" and "A" of the upper pinion gear will receive the piston power stroke and the intake stroke respectively of the piston on the right, piston 20. Lower gear quarters "D" and "B" will do the same for the left piston 21.

This sequence will be reversed for the exhaust and compression strokes, since the power stroke of the left piston is equal to the exhaust stroke of the right piston, and the exhaust stroke of the left piston being equal in time to the intake stroke of the right piston.

The proper mechanical meshing of the upper and lower rack and pinions to avoid clashing of gear teeth during reciprocation is simplified by the precision reversal of the twin oscillating arms and quadruple reversing crank arms. With the precise action of the cam actuated rocking-rack-gears, the pinion gears can be machined to perform as a single gear as synchronized by the reverse action of the precise reciprocating mode of the oscillating arms and its respective crankshaft type of multiple single-crank, oppositely rotating arms.

Further, since the upper and lower gear racks are independent, the axis of the power pinions 10 and 13 may be shifted right and left, above and below, of the vertical centerline of the engine to further facilitate the proper intermeshing of reversing rack and pinion gears at the precise angular degree of reversal. However, this is resolved in the preferred embodiment shown in FIGS. 4 and 5, in which the lateral or horizontal separation of the upper and lower racks works well with the upper and lower pinion gears 10 and 13, without clashing, due to the independent oscillating rocking motion of the arched rack gears 18 and 19.

The amount of "rocking" required is preferably less than 6 degrees up and 6 degrees down, which is equal to the height of the one standard gear tooth of the rack and pinion gear design.

The geared reciprocating engine would not be possible without this unique development. The first and last three gear teeth of the nine toothed rack would clash when the rack reversed direction.

Figure 7C:
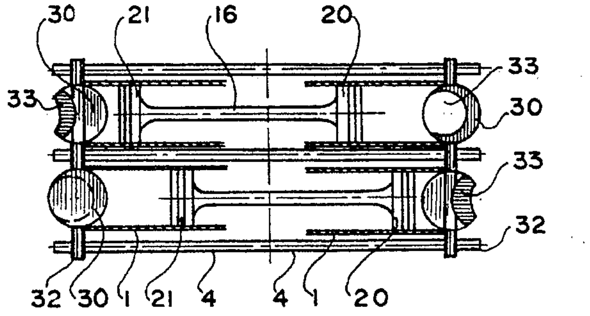
FIG. 7*c*. Schematic plan of 4 cylinder engine.

As shown in FIG. **7*a*, the spherical ball valves 30 are interconnected in line on the common rotating axis 31, four in a row on each side of an 8 cylinder opposed engine. This constitutes only two moving valve mechanisms for an eight cylinder engine which now carries 16 to 32 valves. FIGS. 7*b* and 7*c*** show eight and four cylinder schematics, respectively.

The sequence of the firing order is flexible, unlike the complex geometry of the crankshaft engine, as each of the 8 cylinders may be fired separately at 45 degrees of power shaft rotation, or twin pairs of opposing pistons may be fired four times during the power shaft rotation, similar to the number of power strokes of a conventional engine, per shaft rotation, but with the opposing pistons firing simultaneously to cancel out horizontal vibrations.

Several modes of the firing order may be chosen. Since the drive pinions 10 and 13 are splined to their respective drive shafts 11 and 14 with 45 degree machined splines, the choice of firing order is optional with any engine, by simply reassembling the engine and adjusting the fuel and firing modes.

Cylinder firing orders for an 8 power stroke per shaft revolution, (45 degree intervals), may be 1,5,2,6,3,7,4,8, or 1,3,2,4,7,5,8,6, while a four power stroke order, with opposing pistons firing simultaneously, every 90 degrees, may be 1 & 6, 2 & 7, 4 & 5, and 3 & 8. Another twin order of firing, 4 power strokes per 360 degrees, would be 1 & 4, 5 & 2, 3 & 8, and 7 & 6. These firing orders can be tested with only one prototype engine, since the splined powershafts are adjustable. FIG. **7*a*** shows one bank of the latter firing order, with cylinder number 1, on the left, at power stroke, number 3, at intake, number 5 at compression, and number 7, on the far right, at the exhaust cycle. The valving is now balanced.

Vibration is virtually eliminated in the geared engine due to the lack of the eccentric crankshaft. The oscillating arms and their quadruple crank arms are self canceling in both horizontal and vertical vector components. Thus the reciprocating geared engine will operate smoothly without added balance weights on the drive shaft or on the valve drives.

The spherical valves are individually eccentric in weight and dynamic balance, however, in an eight cylinder engine, the four valves and their cylinders in a "bank" will be rotated 90 to 180 degrees apart, providing for a completely balanced valve "train", as seen in FIG. **7*a***.

The 4-in-a-row spherical ball valves 30 will be fitted with 360 degree toothed gears, (identical in diameter to the pinion gears 10 and 13), driven by synchronizing gears 17, with two smaller gears, or with a conventional timing chain, at the forward and rear accessory sections of the engine.

The slave gears 17 (which synchronize the upper 10 and lower 13 drive pinions gears), also serve as a flywheel in conjunction with the flywheel effect of the twelve centerline segmented drive pinions in an eight cylinder configuration. The four synchronizing gears 17, (two forward, and two aft) insures that all adjacent pistons under power will provide the necessary compression strokes to their neighboring cylinders.

The synchronizing (or slave) gears 17 have the same diameter and tooth geometry to mesh properly with the 4.00/Pi×stroke radius of the upper and lower pinion drive gears. This gear can be driven by subsequent gearing and or drive chains from upper and lower pinion gears 10 and 13 to spherical valve drive pinions 52. The slave gear drive shafts 50 may be used to power left and right Roots types of blowers for supercharging the left and right intake plenums at the rear of the geared reciprocating engine described herein. FIG. 19*b* shows a triple set of synchronizing gears 55, 56, and 57 located at the centerline of the engine as an alternate to the pairs of gears 17 on each side of the center of the engine as shown in FIG. 2.

Manufacture and Construction

The primary cylinder block half 1 as seen in FIG. 2 is symmetrical about both the vertical and horizontal axis. Thus this allows one casting to be utilized for both left and right halves of the combined cylinder block and centerline gear case.

Figure 19A:
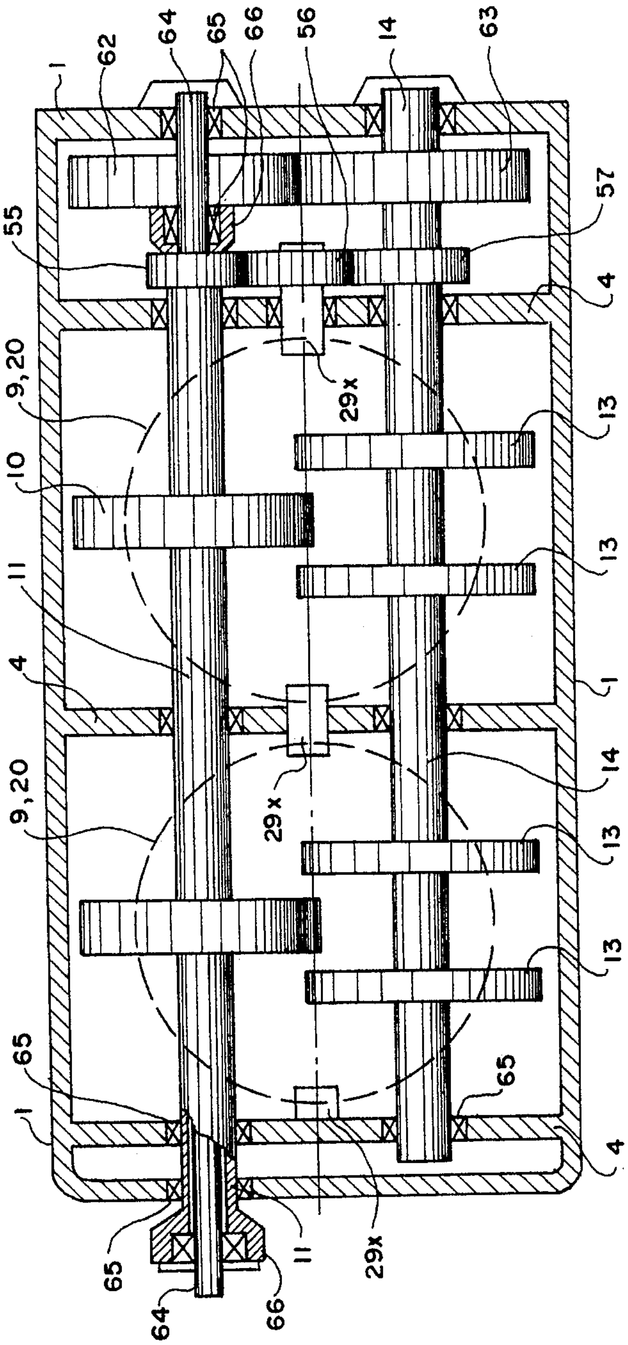
FIG. 19*a*. Schematic longitudinal view of engine with synchronizing gears and location of gears for counter-rotating propellers.

The cylinder blocks are cast with thin diaphragms 4 which occur on each side of the cylinders to provide bearing seats for the pinion shafts, the oscillating shaft at the symmetrical centerline of the engine, 29*x* and the slave shafts at the fore and aft ends of the engine, as well as seating for the spherical valve concentric bearing and drive gear, as shown in FIGS. 19*a* and 19*b*.

The diaphragms 4 are hollowed out to save weight as indicated by the dashed line 52 in FIG. 2. The cylinder halves are cast and bored out with the steel cylinder sleeves sweated in. A pair of castings are bolted together and the bore holes for the shaft bearings are machined in. The diaphragms 4 take the horizontal reciprocating forces developed during the compression and power strokes.

The segmented geared drive pinions 10 and 13, detailed in FIG. 20*a*, are given a pitch diameter equal to 4.00/Pi times the stroke of the engine. A larger bore/stroke engine facilitates the geometry of the spherical valve, and makes for a more efficient "oversquare" engine design.

The twin piston assembly part 20, 21, and 16, is shown in FIG. 20*c* while the rack gear part 18 and crank arms parts 26 and 28 are shown in FIG. 20*b*.

The oscillating arms ends 26, are pinned to the piston connection shaft 16 with pins 29*a* and 29*b*, through the small rotating crank arms 28*a* and 28*b*, shown in FIG. 20*d*, are approximately 1.25 times the stroke from their centers, giving a 12 degree up and down oscillation from the horizontal cylinder axis of the engine. The oscillating arms 26 are pinned at their centers to rigid, short stub axles 29*x* extending from the internal diaphragms 4 at the exact center of engine. With this geometry, the combined oscillating and translating arm mechanisms have the effect of a very large crank shaft diameter of two and one half times (2.50) the stroke of the engine. For a three inch stroke by 3.5 inch bore engine, the effective crankcase diameter is 7.50 inches plus the radius of the crank arms which adds another 1.5 inches, a 9 inch effective radius for a 6 inch stroke.

The spherical ball valves 30, shown in FIGS. 8*a* and 8*b*, with interior diaphragms, can be cast in two halves, machined, welded together and given a final machining. The opening or aperture of the valve may have a central angle 54 of from 120 to 180 degrees, the optimum shown in FIGS. 1, 2, and 8 being 128 degrees, and the maximum diameter of the aperture at the centerline of the sphere can achieve 89 percent of the diameter of the valve.

The connection between in-line valves will be male and female splines on 45 degree axes so that the valve bearing shaft 32, as seen in FIG. 8*a*, can be rotated to the proper alignment for the particular firing sequence chosen. Coolant diversion interior fittings in the large concentric, hollow shaft 32 can be installed to direct the cooling medium to the correct intake and discharge plenums 37.

The spherical ball valves 30 may be installed in their respective valve covers prior to the connection to the valve do-nut ring 6. The gasket, O ring seals, and cylinder-valve head bolts as will complete the basic engine assembly.

In FIG. 19*a* a longitudinal view of the engine is shown schematically for reference with FIG. 19*b*. The location of a set of three, centerline synchronizing gears 55, 56, and 57 are shown at the fore and aft ends of the engine. These are an alternate to the left and right synchronizing gears 17 as indicated in FIG. 2, and have a pitch diameter of 2/Pi× Stroke. Chain spoke drives 55*a* and 56*a* are attached to 55 and to 56 to drive the right and left spherical valves in the required opposite rotations. Chain drives 58 and 59 drive chain sprockets 60 and 61, which drive the right and left spherical valves to accomplish the above.

In FIG. 19*a*, the option of adding a counter-rotating, concentric power-take-off shaft is shown by the use of added gears 62 and 63. These gears have the same pitch diameter of the drive pinions 10 and 13, and are fully toothed so as to drive the internal, concentric counter-rotating drive shaft 64 which is diametrically clear of the large, upper drive shaft 11. Bearings 65 supported by integrally cast diaphragms 4 support the drive shafts for this feature. A special bearing "cup" 66 is used at each end of the upper drive shaft 11 to provide roller bearing thrust supports for the concentric opposite rotating shaft 64. All of the above is possible due to the fact that the upper and lower drive shafts 11 and 14 are continuous through the longitudinal centerline of the engine, unbroken, as would not be possible with a conventional crankshaft driven engine. The diameter of the thick, hollow drive shafts are unlimited by the engine design and may be equal to more than one half the pinion gear size.

In FIG. 19*b*, drive chains 58 and 59 driven by gear spokes 55*a* and 56*a*, which are extensions of the upper synchronizing gear 55 and the center synchronizing gear 56, drive the counter-clockwise left-spherical valve by sprocket 61 and the right-clockwise spherical valve by sprocket 60.

In FIG. 2, intake manifolds 40 at the top of the engine are fed by a supercharged plenum 53 which is charged by Roots blowers driven by the slave gear drive shafts at the rear of the engine. Exhaust manifolds 41 are directed below the engine, and may be aligned in parallel rows in the conventional manner to be received by a pair of mufflers if desired.

IF FIG. 2*a*, the sealing rings 7*a* and 7*b* are provided lubricating oil film by means of forced cylinder block oil pressure through drilled apertures 67 and 68.

I claim:

1. A reciprocating gear-driven engine comprising:

(a) at least a pair of opposed cylinders, (b) a double-ended piston disposed in each cylinder, each double ended piston comprising a rigid piston shaft connecting two piston elements;

(c) an upper circular pinion gear and two lower circular pinion gears, (i) the pinion gears having gear teeth disposed on alternating quarters of their circumference meshing with curved rack gears, (ii) the curved rack gears having circular pin supports disposed and rotating about the center of the rigid piston shaft, and (iii) the curved rack gears rotated into position for intermeshing with the respective pinion gears; and (d) cam arms for rotating the curved rack gears into position with the pinion gears, the cam arms being located on the reverse side of the curved rack gears, the curved rack gears being rotated into position by cam rollers riding on cam lobes protruding from the upper and lower pinion gears, wherein:

(i) the gears rotate in clockwise rotation and are synchronized by slave gearing at the forward and rear ends of the engine, (ii) the upper and lower pinion gears are supported by large diameter, thick, hollow drive shafts at a vertical distance apart from one another, from the radial center of the gear teeth on the lower pinion gear to the radial center of the lower pinion gear, of 2/Pi times the stroke of the engine, (iii) the pinion gears have a diameter, measured to the radial center of the gear teeth, of 4/Pi times the stroke of the engine, and thus a gear pitch diameter with a circumference equal to four times the stroke, (iv) the center of the piston connecting shaft moves from a forwardmost position to a rearwardmost position, and the stroke is equal to the movement, from the forwardmost position to the rearwardmost position, of the center of the piston connecting shaft, (v) the shaft is made to reciprocate independently of the pinion gears by dual oscillating arms on either side of the piston shaft with pairs of crank arms having a length equal to one half the stroke, disposed so as to effect a set of four small reversible crankshafts, (vi) each crank arm is attached to pins disposed on each side of the rigid piston shaft, causing the reciprocating piston motion to rotate the upper and lower pinion gears in clockwise rotation, (vii) the pinion gears are splined to upper and lower drive shafts having gearing at the ends of the engine, driving common shafts at each end of the banks of the opposed cylinders, (viii) spherical, truncated ball valves are disposed at the ends of the cylinders to effect a means of providing an intake manifold, an exhaust manifold, a compression head portion and a reactive cylinder head power stroke surface, (ix) each spherical valve is sealed by a pair of circular piston-type rings, (x) the spherical valve is supported by hollow shafts normal to the cylinder axis and having apertures for the passage of cooling air or coolant liquid, (xi) the spherical valves are aligned in two banks, and (xii) the spherical valve shafts have geared means to rotate clockwise on one bank of spherical valves and counter-clockwise on the other bank for the disposition of common intake plenums and common exhaust manifolds respectively above and below the engine.

2. The engine of claim 1, comprising at least two opposed pistons and cylinders, and constructed with all opposed cylinders on a mutual horizontal axis with the pistons being rigidly connected by a multiple undulated, U-shaped shaft.

3. The engine of claim 1, wherein the rack gears include laterally displaced upper and lower curved gear racks installed within the rigid piston shaft the upper pinion at the center of the engine meshing with the lower rack gears, the lower rack gears each having a width of half the width of the upper gear and disposed on either side of the center pinion gear.

4. The engine of claim 1, wherein the rack gears include upper and lower curved rack gears rotating about a pin located at, or very near, the centerline of the shaft of the pistons.

5. The engine of claim 1, wherein the dual oscillating arms oscillate at least 24 degrees vertically up and 24 degrees vertically down, and the crank arms rotate 360 degrees and are disposed to smoothly reverse the piston travel at top dead center and bottom dead center, in agreement with the contact of the curved rack gears which drive the upper and lower pinion gears.

6. The engine of claim 1 comprised of upper and lower drive pinions disposed to each rotate clockwise, without direct contact except by the use of synchronizing, counter-clockwise, equal diameter gears at the forward and rear of the engine cylinder and gear block, located to the left and right centerline of the engine, or by three equal diameter smaller gears, equal in diameter to half that of the drive pinions, and vertically aligned at the center of the engine.

7. The engine of claim 1, further comprising sealing type of circular piston-type-rings seated against the spherical valve, and supported in a circular hollow ring at the top of the cylinders, and disposed to serve as a partial cylinder head.

8. An opposed cylinder reciprocating engine, of at least 2 cylinders as described in claim 1, comprising a spherical, truncated valve disposed to rotate one complete revolution in one direction, for all four compression, power, exhaust and intake strokes of the conventional four cycle combustion engine.

9. A reciprocating gear-driven engine comprising:

(a) at least a pair of opposed cylinders, (b) a double-ended piston disposed in each cylinder, each double ended piston comprising a piston shaft connecting two piston elements;

(c) an upper pinion gear and two lower pinion gears, (i) the pinion gears having gear teeth disposed on alternating quarters of their circumference meshing with curved rack gears, (ii) the curved rack gears having pin supports disposed and rotating about the center of the piston shaft, and (iii) the curved rack gears rotated into position for intermeshing with the respective pinion gears; and (d) cam arms for rotating the curved rack gears into position with the pinion gears, the cam arms being located on the reverse side of the curved rack gears, the curved rack gears being rotated into position by cam rollers riding on cam lobes protruding from the upper and lower pinion gears, wherein:

(i) the gears rotate in clockwise rotation and are synchronized by slave gearing, (ii) the upper and lower pinion gears are supported by drive shafts at a vertical distance apart from one another, from the radial center of the gear teeth on the lower pinion gear to the radial center of the lower pinion gear, of 2/Pi times the stroke of the engine, (iii) the pinion gears have a diameter, measured to the radial center of the gear teeth, of 4/Pi times the stroke of the engine, and thus a gear pitch circumference equal to four times the stroke, (iv) the center of the piston connecting shaft moves from a forwardmost position to a rearwardmost position, and the stroke is equal to the movement, from the forwardmost position to the rearwardmost position, of the center of the piston connecting shaft, (v) the shaft is made to reciprocate independently of the pinion gears by dual oscillating arms on either side of the piston shaft with pairs of crank arms having a length equal to one half the stroke, disposed so as to effect a set of four small reversible crankshafts, (vi) each crank arm is attached to pins disposed on each side of the piston shaft, causing the reciprocating piston motion to rotate the upper and lower pinion gears in clockwise rotation, (vii) the pinion gears are splined to upper and lower drive shafts having gearing driving common shafts at each end of the banks of the opposed cylinders, (viii) spherical, truncated ball valves are disposed at the ends of the cylinders to effect a means of providing an intake manifold, an exhaust manifold, a compression head portion and a reactive cylinder head power stroke surface, (ix) each spherical valve is sealed by at least one circular piston-type rings, (x) the spherical valve is supported by shafts normal to the cylinder axis, (xi) the spherical valves are aligned in two banks, and (xii) the spherical valve shafts have geared means to rotate clockwise on one bank of spherical valves and counter-clockwise on the other bank for the disposition of common intake plenums and common exhaust mainfolds respectively above and below the engine.

* * * * *